United States Patent
Totzeck et al.

(10) Patent No.: US 8,126,669 B2
(45) Date of Patent: Feb. 28, 2012

(54) OPTIMIZATION AND MATCHING OF OPTICAL SYSTEMS BY USE OF ORIENTATION ZERNIKE POLYNOMIALS

(75) Inventors: Michael Totzeck, Schwaebisch Gmuend (DE); Daniel Kraehmer, Essingen (DE); Ralf Mueller, Aalen (DE); Johannes Ruoff, Aalen (DE); Vladan Blahnik, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 463 days.

(21) Appl. No.: 12/421,996

(22) Filed: Apr. 10, 2009

(65) Prior Publication Data
US 2009/0306921 A1 Dec. 10, 2009

Related U.S. Application Data

(60) Provisional application No. 61/059,893, filed on Jun. 9, 2008, provisional application No. 61/107,748, filed on Oct. 23, 2008.

(51) Int. Cl.
*G01D 18/00* (2006.01)
*G01B 9/00* (2006.01)

(52) U.S. Cl. .......... 702/82; 73/1.01; 73/865.9; 356/124; 702/90; 702/182; 702/189

(58) Field of Classification Search .................... None
See application file for complete search history.

(56) References Cited

U.S. PATENT DOCUMENTS
5,963,365 A 10/1999 Shirai
2006/0109560 A1* 5/2006 Kamenov et al. ............. 359/649

FOREIGN PATENT DOCUMENTS
WO WO 2004/019128 3/2004
WO WO 2007/086220 8/2007

OTHER PUBLICATIONS

McIntyre, G.R., et al.: "Polarization aberrations in hyper-numerical-aperture projection printing: a comparison of various representations", Journal of Microlithography, Micro-fabrication and Microsystems, 2006. 5(3): p. 33001-33031.
McGuire, J.P., Jr. and R.A. Chipman: "Polarization aberrations. 1. Rotationally symmetric optical systems", Applied Optics, 1994. 33(22): p. 5080-5100.
Geh, B., et al., "The impact of projection lens polarization properties on lithographic process at hyper-NA" in Optical Microlithography XX. 2007. USA: SPIE-Int. Soc. Opt. Eng. vol. 6520, p. 6520-15.

* cited by examiner

*Primary Examiner* — Andrew Schechter
*Assistant Examiner* — L. Anderson
(74) *Attorney, Agent, or Firm* — Fish & Richardson P.C.

(57) ABSTRACT

The present disclosure relates to specification, optimization and matching of optical systems by use of orientation Zernike polynomials. In some embodiments, a method for assessing the suitability of an optical system of a microlithographic projection exposure apparatus is provided. The method can include determining a Jones pupil of the optical system, at least approximately describing the Jones pupil using an expansion into orientation Zernike polynomials, and assessing the suitability of the optical system on the basis of the expansion coefficient of at least one of the orientation Zernike polynomials in the expansion.

20 Claims, 21 Drawing Sheets

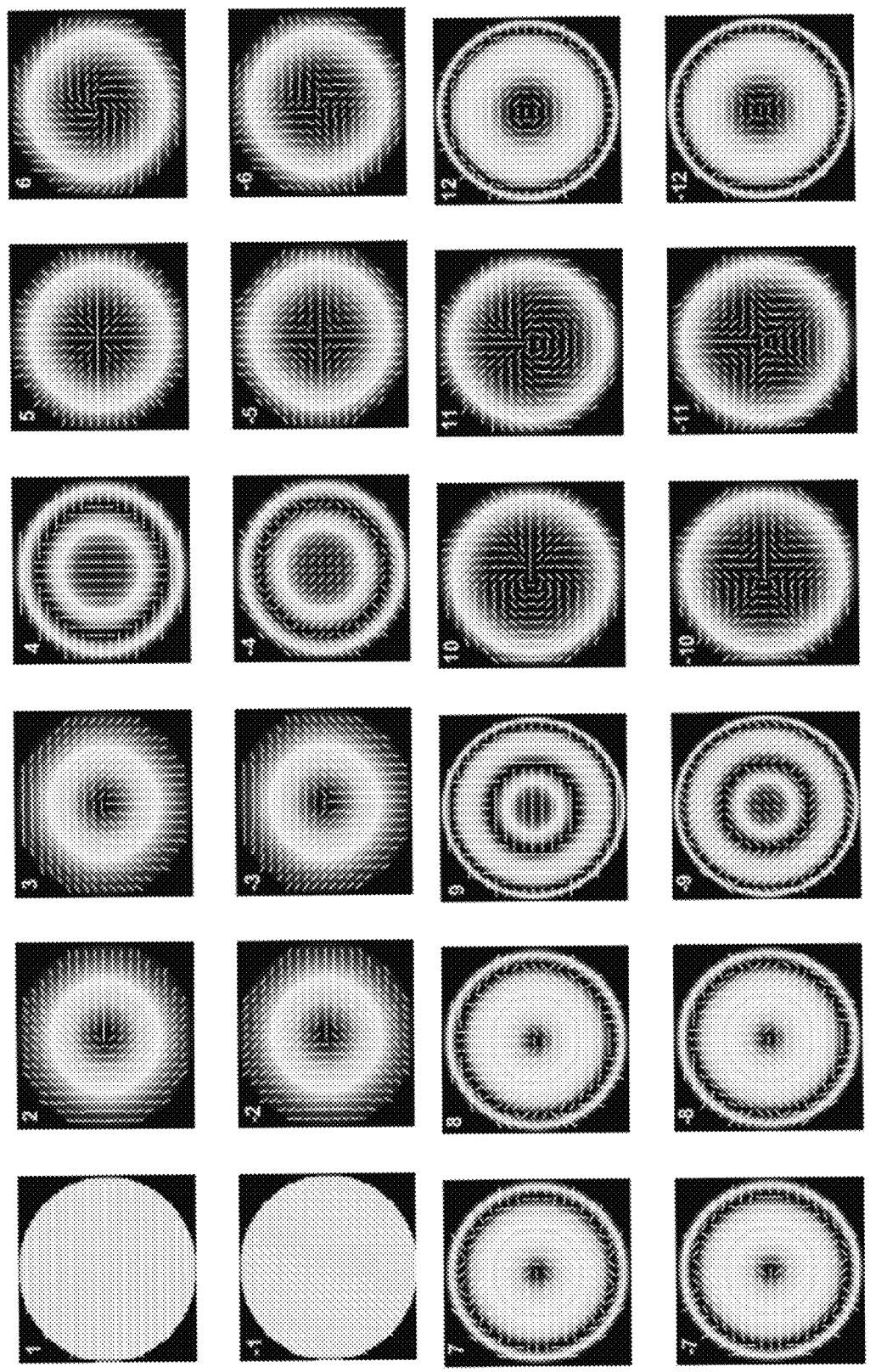
FIG. 2A Orientation Zernike polynomials

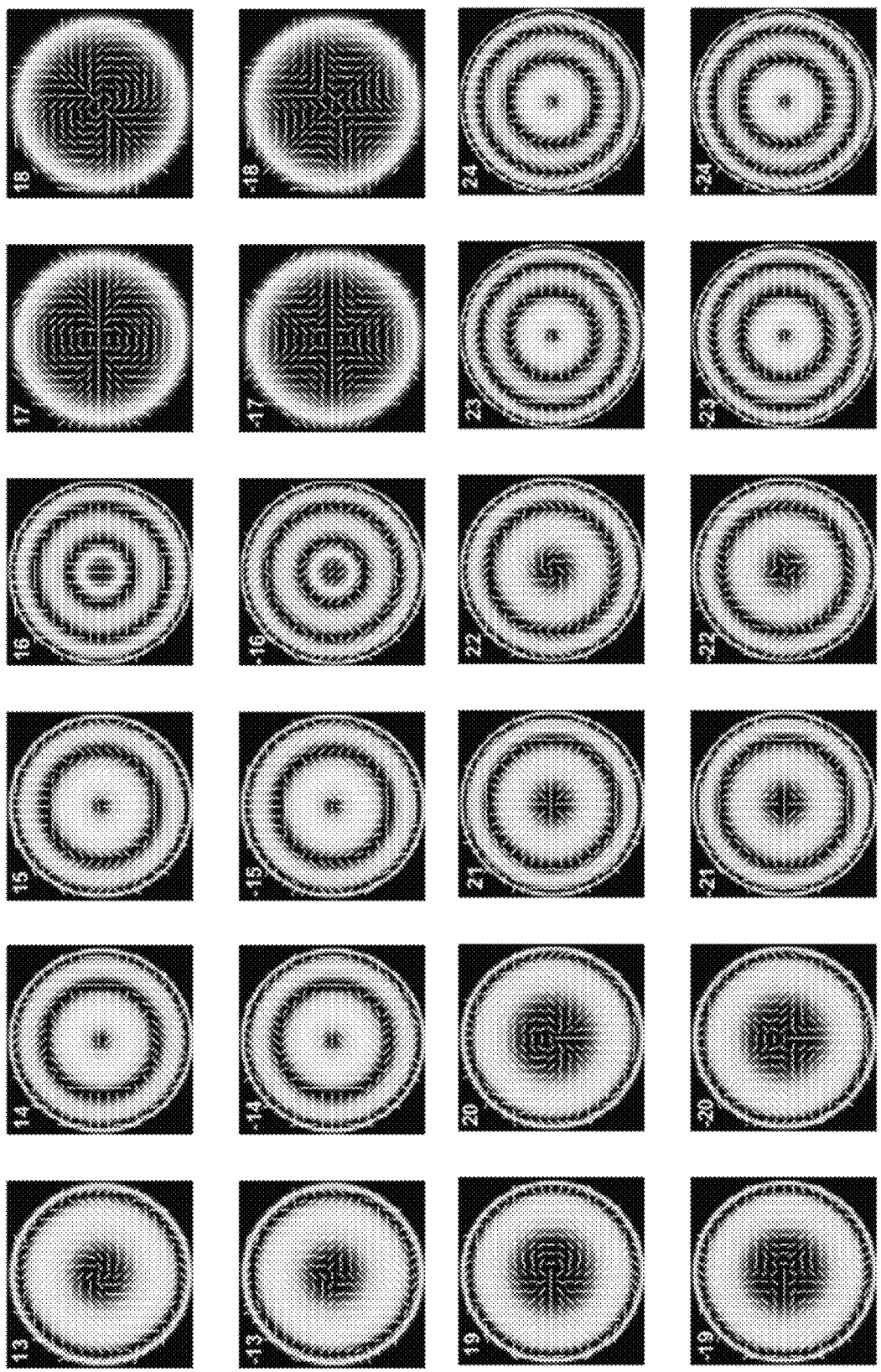
FIG. 2B  Orientation Zernike polynomials

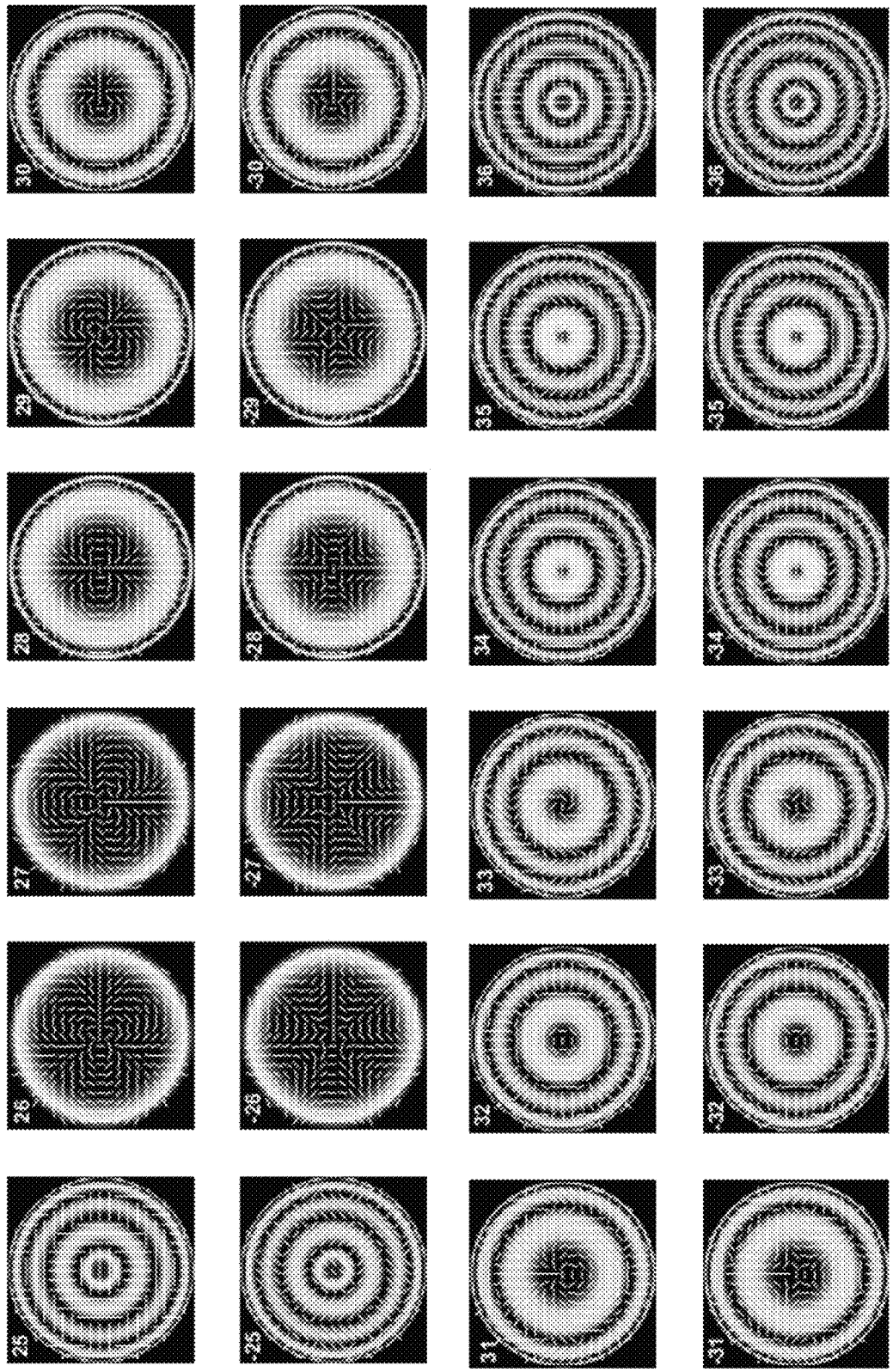
FIG. 2C Orientation Zernike polynomials

US 8,126,669 B2

OPTIMIZATION AND MATCHING OF OPTICAL SYSTEMS BY USE OF ORIENTATION ZERNIKE POLYNOMIALS

CROSS-REFERENCE TO RELATED APPLICATIONS

This application claims priority under 35 U.S.C. §119(e)(1) to U.S. Provisional Application Nos. 61/059,893, filed Jun. 9, 2008, and 61/107,748 filed on Oct. 23, 2008. The contents of both of these applications are hereby incorporated by reference.

FIELD

The disclosure relates to specification, optimization and matching of optical systems by use of orientation Zernike polynomials.

BACKGROUND

Microlithography is used in the fabrication of microstructured components like integrated circuits, LCD's and other microstructured devices. The microlithographic process is performed in a so-called microlithographic exposure system including an illumination system and a projection lens. The image of a mask (or reticle) being illuminated by the illumination system is projected, through the projection lens, onto a resist-covered substrate, typically a silicon wafer bearing one or more light-sensitive layers and being provided in the image plane of the projection lens, in order to transfer the circuit pattern onto the light-sensitive layers on the wafer.

The generalized description of the propagation of polarized light through the projection lens uses complex electromagnetic transfer functions like Jones pupils, Mueller matrices or Stokes parameters. Nevertheless, Geh, B., et al., "The impact of projection lens polarization properties on lithographic process at hyper-NA" in Optical Microlithography XX. 2007. USA: SPIE-Int. Soc. Opt. Eng. Vol 6520, p. 6520-15, showed that in current lithography lenses these transfer functions can be simplified to pupil maps corresponding to the basic physical effects of apodization, retardation and diattenuation. The so-called Zernike expansion of the scalar projection lens aberrations has been successfully introduced to provide the basis for a better understanding, control, and reduction of aberration induced imaging errors. In certain optical systems, the scalar Zernike polynomials provide a convenient base set.

SUMMARY

In some embodiments, it is desirable to have a corresponding base set also for relatively high performance and polarized operation. It can be advantageous if the set has the following properties:
  Symmetry: Terms with m-fold rotation symmetry, i.e. the pupil reproduces itself after rotation by i/m*360° (i=1 . . . m)
  Physical meaning: Typical imaging errors correspond to a low number of coefficients (optionally just one)
  Simple relationship to scalar imaging errors
  Simple relationship to component errors.

Aspects of the present disclosure are related to the specification, optimization and matching of optical systems by use of orientation Zernike polynomials (="OZPs"). The extension of scalar Zernike polynomials to orientation Zernike polynomials allows the expansion of diattenuation and retardance of the pupil. In combination with scalar Zernike polynomials they provide a set for the complete specification of the imaging properties of high NA lenses.

In some embodiments, the disclosure provides a method for assessing the suitability of an optical system of a microlithographic projection exposure apparatus. The method includes: determining a Jones pupil of the optical system; at least approximately describing the Jones pupil using an expansion into orientation Zernike polynomials; and assessing the suitability of the optical system on the basis of the expansion coefficient of at least one of the orientation Zernike polynomials in the expansion.

In certain aspects, the disclosure involves the concept of decomposing the Jones pupil, according to the so-called SVD-algorithm (SVD=singular value decomposition), into pupil maps corresponding to the basic physical effects of apodization (i.e. scalar pupil transmission), phase, retardation and diattenuation. In some embodiments, these basic pupil maps are decomposed into suited base functions.

For apodization, i.e. the scalar pupil transmission, as well as for the phase it is possible to stick to the well known scalar Zernike approach. Retardation and diattenuation, however, are caused by orientation dependent effects like birefringence which do not allow a scalar description like Zernikes. Therefore, the "Orientation Zernike Polynomials" are introduced, which are defined below and which allow a complete and systematic description of polarized imaging using lithography lenses. The base function treatment disclosed herein can allow a complete and systematic description of polarized imaging using lithography lenses. Similar to the Zernike polynomials of the scalar wavefront, the orientation Zernike polynomials allow to calculate imaging sensitivities with respect to the Zernike and Orientation-Zernike coefficients, to do simulations based on these sensitivities with focus on OPC behavior, and to define process control limits in lens production.

The orientation Zernike polynomials support a thorough understanding of polarized imaging, its modelling, and represent the basis for a control of polarization effects to uncritical levels.

In some embodiments, assessing the suitability the optical system is rated as being within tolerance if the expansion coefficient(s) is/are below a respective predetermined threshold, and that the optical system is rated as being not within tolerance if the expansion coefficient(s) is/are not below the predetermined threshold.

In certain embodiments, the mean value for the expansion coefficient(s) across an illumination field (e.g. the scanner slit) is/are used. Additionally or alternatively, in some embodiments, the field variation of the expansion coefficient(s) between center and edge of an illumination field (e.g. the scanner slit) is considered.

In some embodiments, when assessing the suitability, the optical system is rated as being within tolerance only if for the expansion coefficient the field variation of the expansion coefficient(s) between the center and the edge of an (typically rectangular) illumination field (e.g. the scanner slit) is less than a predetermined threshold value.

In certain embodiments, the disclosure provides a method that includes: determining a sensitivity function, which describes, for at least for some of the orientation Zernike polynomials, the impact of the respective orientation Zernike polynomial on a lithography parameter; and assessing the suitability of the optical system using the sensitivity function.

In some embodiments, the lithography parameter belongs to the group CD deviation, image placement errors and deviation between horizontal and vertical structures.

In certain embodiments, the sensitivity function is multiplied with the expansion.

In some embodiments, the optical system includes at least one anti-reflective (AR) layer and/or at least one high-reflective (HR) layer, and the thickness and/or material of at least one of the layers is modified in dependence of the assessment.

In certain embodiments, when assessing the suitability, the expansion coefficients of only a subgroup of orientation Zernike polynomials are considered, the number of orientation Zernike polynomials in the subgroup not exceeding 25 (e.g., not exceeding 16, not exceeding 8, not exceeding 5). Here the disclosure makes use of the realization that comparable few of the expansion coefficients have significant impact on imaging. Data taken from actual lens populations demonstrate the successful control of these parameters in lens production.

In some embodiments, when assessing the suitability, the expansion coefficients of only a subgroup of orientation Zernike polynomials are considered, the order of orientation Zernike polynomials in the subgroup not exceeding 20 (e.g., not exceeding 15, not exceeding 10).

The orientation Zernike polynomials can be defined as $$\vec{W}_{nm\epsilon} = R_n^{|m|} \vec{\Phi}_{m\epsilon}$$

wherein $R_n^m$ are radial polynomials given by $$R_n^m(r) = \sum_{s=0}^{(n-m)/2} (-1)^s \frac{(n-s)!}{s!\left(\frac{1}{2}(n+m)-s\right)!\left(\frac{1}{2}(n-m)-s\right)!} r^{n-2s}$$

with m, n, s being integers, m=−n, . . . , n and $\epsilon$=0 or 1, and wherein $\vec{\Phi}_{m\epsilon}$ is given by $$\vec{\Phi}_{m0} = \begin{pmatrix} \cos\frac{m\varphi}{2} \\ -\sin\frac{m\varphi}{2} \end{pmatrix}, \vec{\Phi}_{m1} = \begin{pmatrix} \sin\frac{m\varphi}{2} \\ \cos\frac{m\varphi}{2} \end{pmatrix}.$$

In some embodiments, the optical system is a projection lens of the microlithographic projection exposure apparatus.

In certain embodiments, the optical system is a single optical element, such as the last lens element, of the microlithographic projection exposure apparatus, or a group of elements of a projection lens of the microlithographic projection exposure apparatus.

The disclosure also provides a method for matching the polarization properties of at least two optical systems of a microlithographic projection exposure apparatus to each other. In some embodiments, the method includes: determining a Jones pupil of each of the optical systems; at least approximately describing, for each of the optical systems, the respective Jones pupil using an expansion into orientation Zernike polynomials; and modifying at least one of the optical systems such that the difference between the expansion coefficient of at least one of the orientation Zernike polynomials in the expansions for the optical systems is reduced.

In certain aspects, it may be acceptable if the respective expansion coefficient(s) being considered are not very good or optimized for each individual one of the optical systems, but a similarity or even identity exists with regard to the respective expansion coefficient(s) if a comparison is made between the different optical systems, so that similar or at least almost identical results are obtained in the microlithographic process, as far as polarization effects are concerned, if changing from one system to the other.

In some embodiments, the disclosure provides a method for designing an optical system of a microlithographic projection exposure apparatus. The method includes: determining, for a preset design of the optical system, a Jones pupil of the optical system; at least approximately describing the Jones pupil using an expansion into orientation Zernike polynomials; establishing a quality function which incorporates the expansion coefficient of at least one of the orientation Zernike polynomials in the expansion; and designing the optical system with a modified design being selected such that the quality function is improved for the modified design with respect to the preset design.

Optionally, the optical system may be the illumination system or the projection lens of the microlithographic projection exposure apparatus, or it may also be a single optical element (e.g. a last lens element) or a group of optical elements of the microlithographic projection exposure apparatus.

In certain embodiments, the disclosure provides a method for designing a microlithographic projection exposure apparatus that includes an illumination system and a projection lens. The method includes: determining, for a preset design of the microlithographic projection exposure apparatus, a first Jones pupil of the illumination system; at least approximately describing the first Jones pupil using a first expansion into orientation Zernike polynomials; determining, for the given design of the microlithographic projection exposure apparatus a second Jones pupil of the projection lens; at least approximately describing the second Jones pupil using a second expansion into orientation Zernike polynomials; establishing a quality function which incorporates the expansion coefficient of at least one of the orientation Zernike polynomials in each of the first and second expansion; and designing the microlithographic projection exposure apparatus with a modified design being selected such that the quality function is improved for the modified design with respect to the preset design.

In some embodiments, it may be acceptable if the respective expansion coefficient(s) being considered are not very good or optimized for both the illumination system and the projection lens, but the illumination system and the projection lens synergize to yield a desired or acceptable overall performance of the microlithographic projection exposure apparatus.

In some embodiments, the disclosure provides a method for evaluating the polarization properties of an optical system of a microlithographic projection exposure apparatus. The method can include: determining a Jones pupil of the optical system; at least approximately describing the Jones pupil using an expansion into orientation Zernike polynomials; and evaluating the polarization properties of the optical system on the basis of the expansion.

In certain embodiments, the disclosure provides an optical system of a microlithographic projection exposure apparatus. The optical system includes a device for determining a Jones pupil of the optical system; and a computer which at least approximately describes the Jones pupil using an expansion into orientation Zernike polynomials.

The determination of the Jones pupil can be realized by simulation and/or measurement.

In certain embodiments, the computer is configured to compare the expansion coefficient of at least one of the Orientation Zernike Polynomials with a predetermined threshold.

In some embodiments, the optical system further includes at least one manipulator to manipulate the polarization properties of the optical system based upon the comparison. Such a manipulation can be realized such that the resulting expansion coefficient(s) of the considered Orientation Zernike polynomial(s) (=OZPs) are minimized or at least reduced.

Embodiments can provide one or more of the following features:

- providing an optical system of which the OZP coefficients are provided, too;
- providing an optical system of which the OZPs are below a given threshold (which can be applied to both the mean value and the field variation);
- providing an optical system of which the components are specified using OZPs;
- providing a set of optical systems in which the difference of certain OZPs is below a given value;
- optical system including illumination and projection lens, in which the OZPs of both parts are related, in order to yield a specified overall performance;
- determining a sensitivity function, which describes, for at least for some of the orientation Zernike polynomials, the impact of the respective orientation Zernike polynomial on a lithography parameter, and assessing the suitability of the optical system using the sensitivity function.

BRIEF DESCRIPTION OF THE DRAWINGS

FIGS. 2A-2C shows orientation Zernike polynomials.

DETAILED DESCRIPTION

Figure 1:
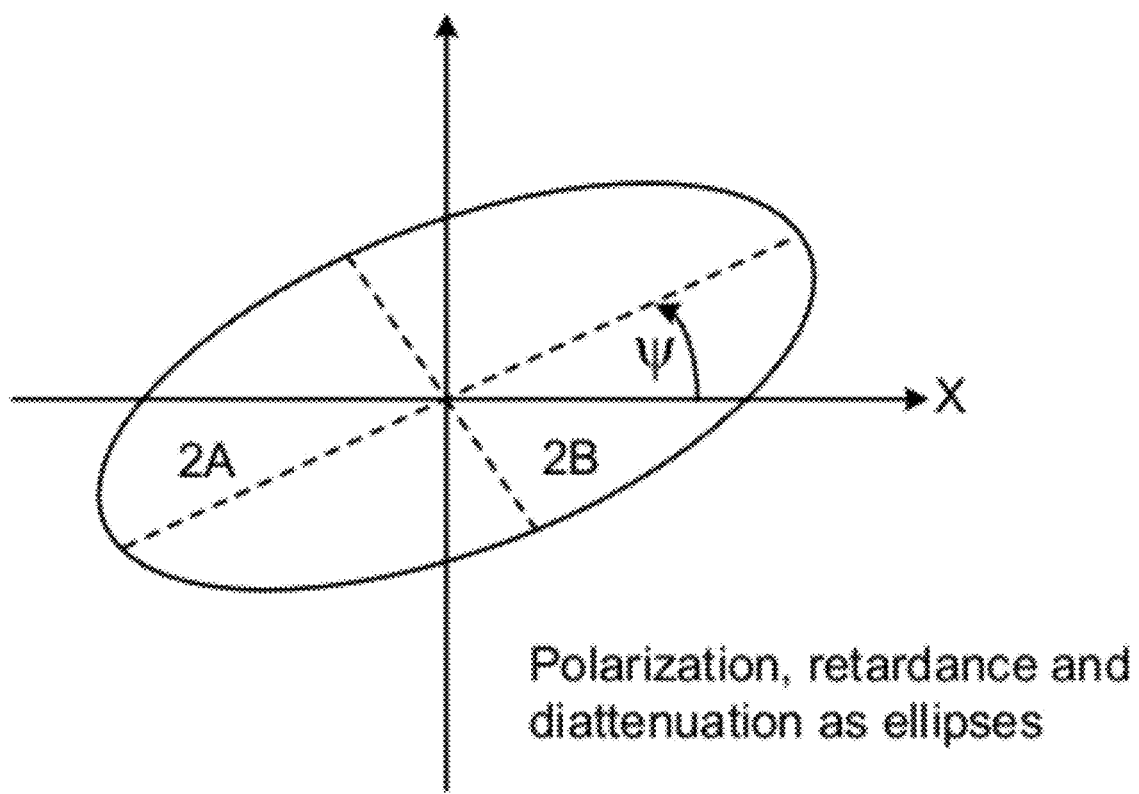
FIG. 1 depicts polarization, retardance and diattenuation as ellipses.
Figure 3A:
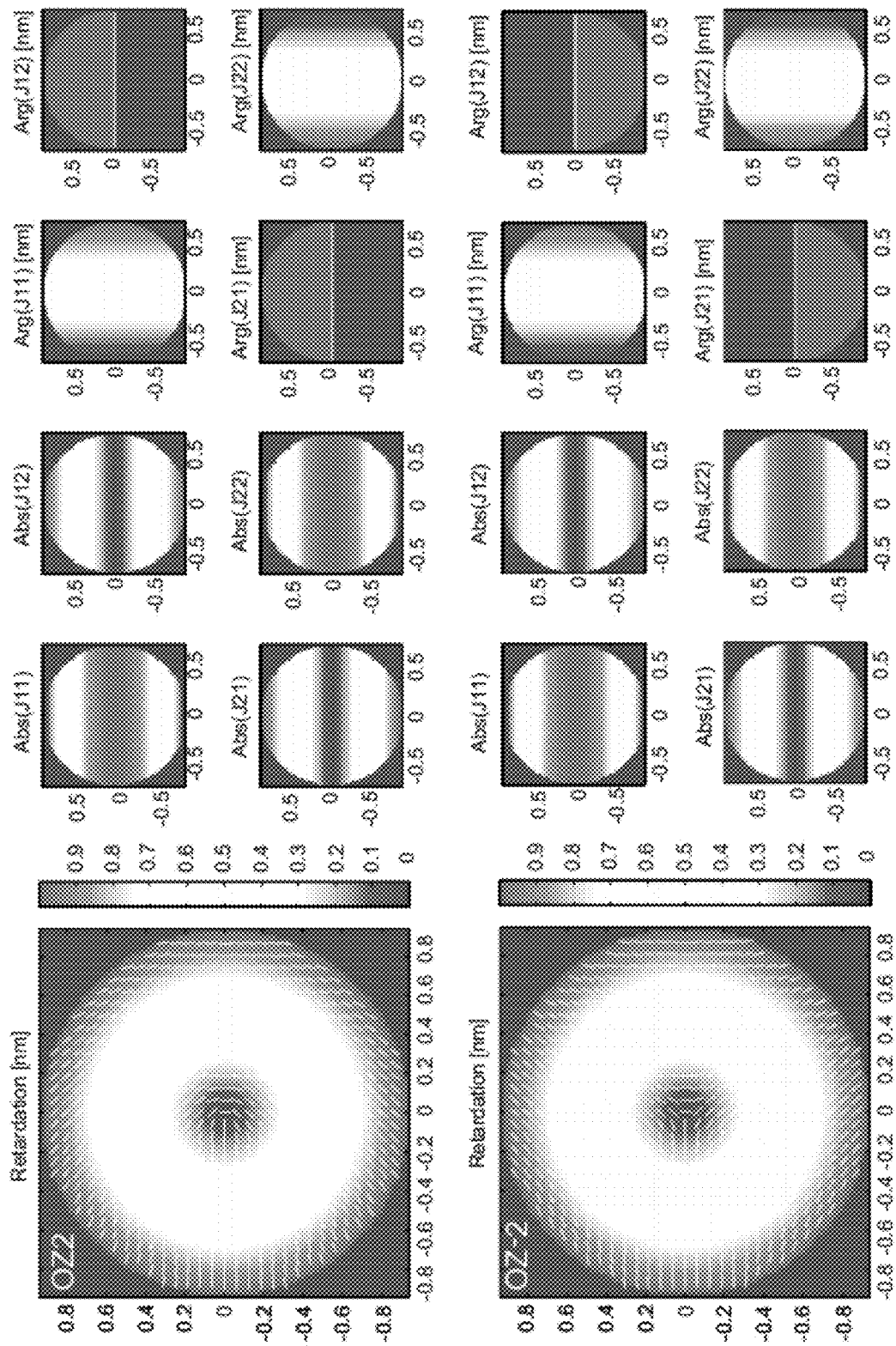
FIGS. 3A-3E shows correspondence between Retardation Orientation Zernike polynomials and Jones pupil.
Figure 3B:
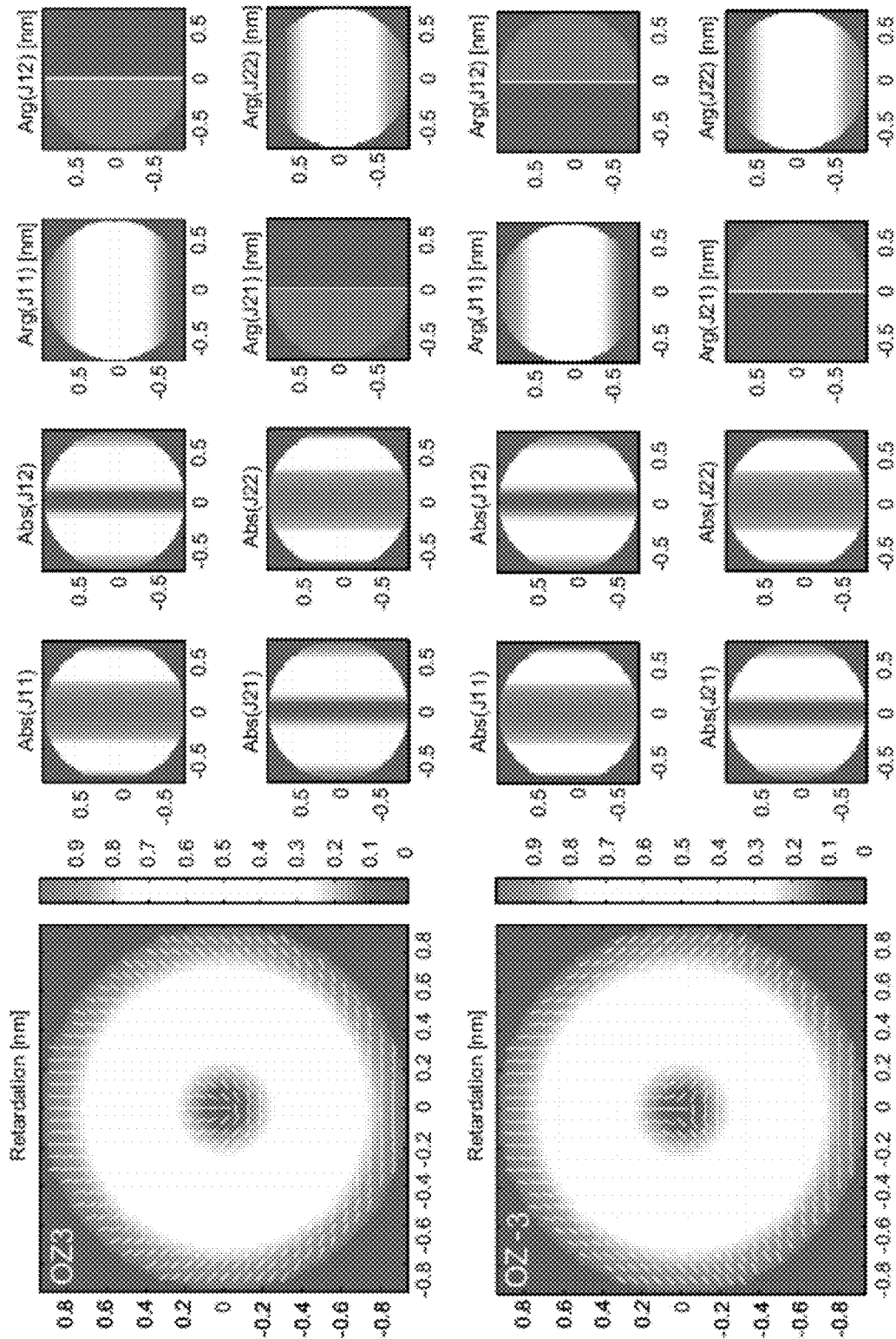
Figure 3C:
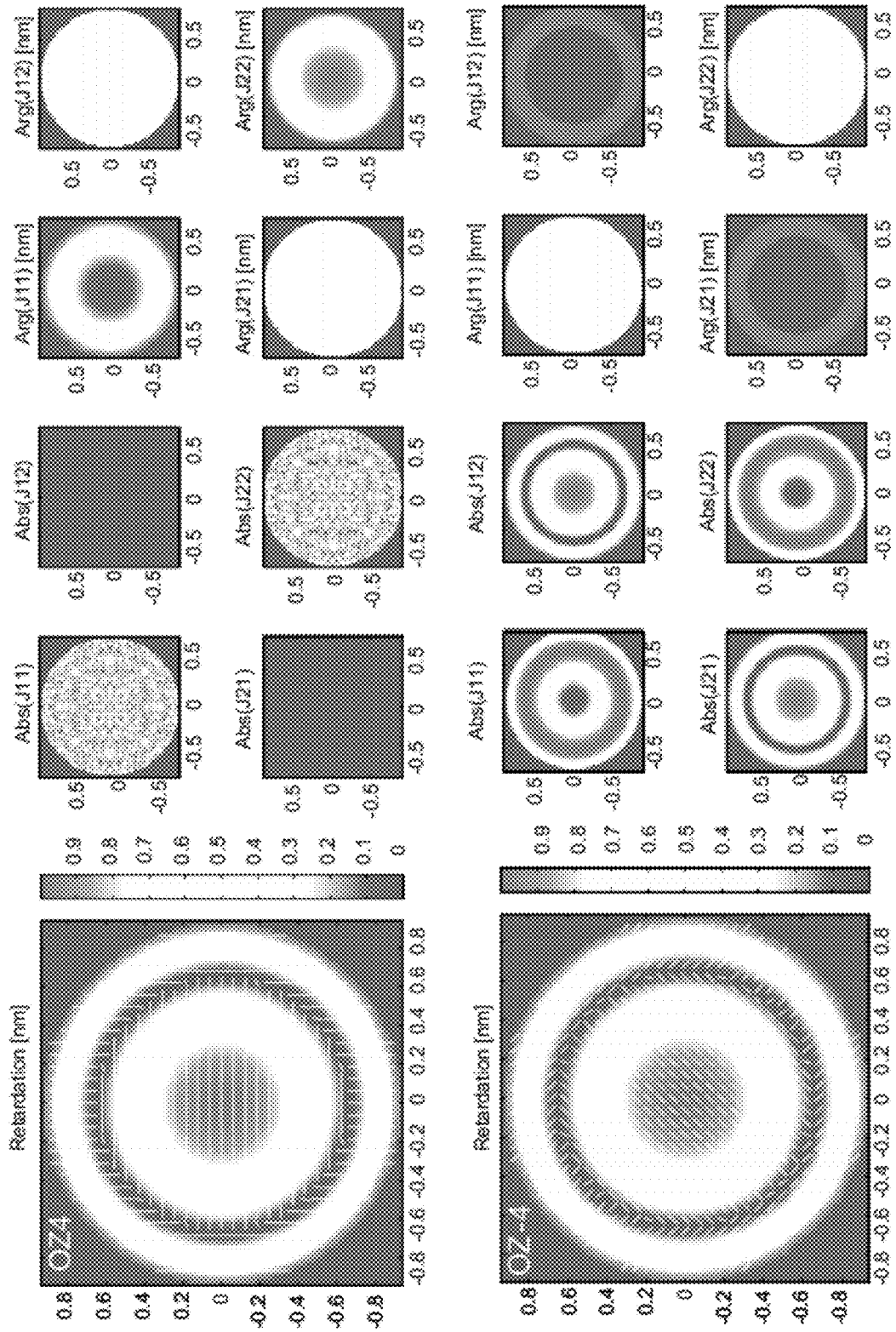
Figure 3D:
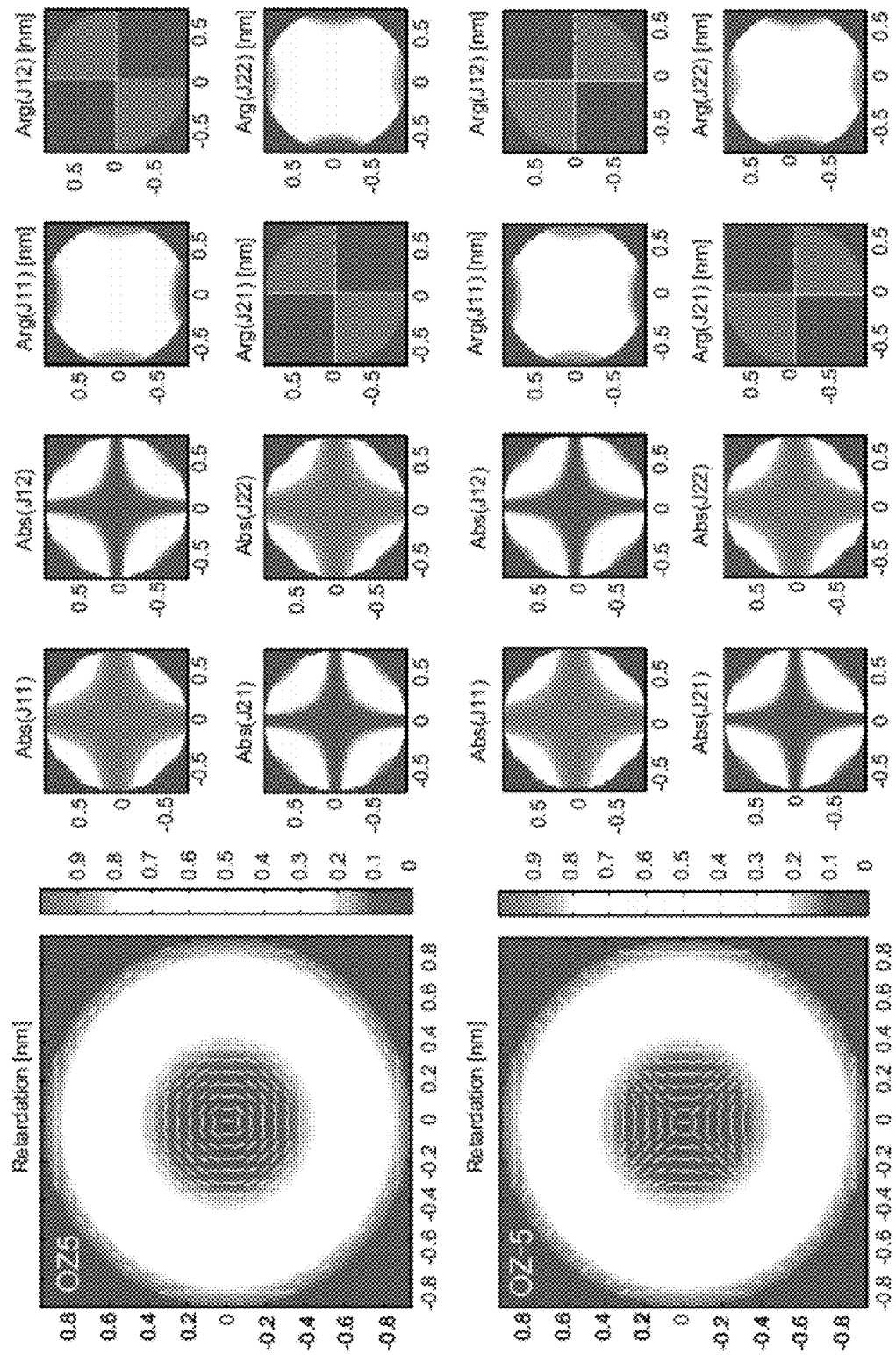
Figure 3E:
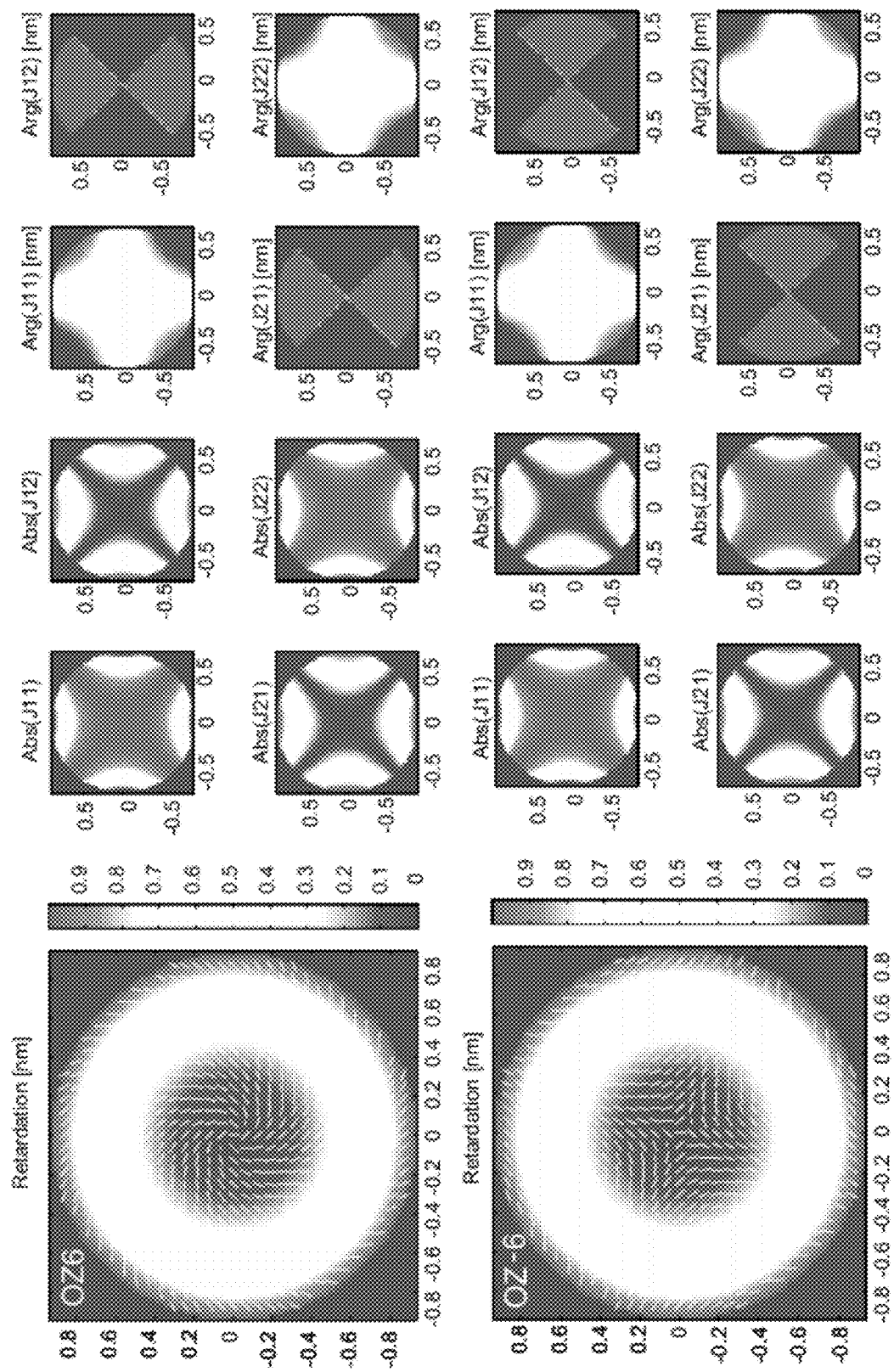

The scalar pupil of an optical system includes the phase and the intensity effect on traversing rays. Unfortunately it may not be possible to describe the imaging properties of high numerical aperture optical systems completely by use of a scalar pupil. The polarization dependence of the imaging contrast makes the incorporation of the transformation of polarization states mandatory. A rule of thumb for the occurrence of high-NA effects is that such effects occur for an NA of 0.8 or larger.

The complete specification of the pupil—apart from depolarization effects—is accomplished via the Jones pupil. The Jones pupil assigns a Jones matrix to each pupil point. As is well known, the Jones matrix describes the transformation of Jones vectors which in turn describe the—in general elliptical—polarization states of a given ray.

The effects on the polarization state of a traversing ray are conveniently separated into a set of elemental effects. These are a) change of phase→scalar phase
b) change of intensity→scalar transmission (apodization)
c) induced partial polarization→diattenuation
d) change of polarization ellipticity→retardance
e) rotation of polarization state.→retardance A reliable and stable method to separate a Jones pupil into the elemental effects can be provided by the so-called polar decomposition obtained from the singular value decomposition.

$$J = VDW^+ \quad (1)$$

V and W are unitary matrices. Their product yields the retardance matrix $U=VW^+$. The diagonal matrix D has positive real elements—the singular values. The relation to the elemental effects is given in Table 1:

TABLE 1

| Effect | Formula | |
|---|---|---|
| Scalar phase | $\varphi = \arg\{\sqrt{|U|}\}$ | (2) |
| Scalar transmission | $T = \frac{1}{2}(D_{11}^2 + D_{22}^2)$ | (3) |
| Retardance magnitude | $\Delta\varphi = 2 + \arccos\left\{\frac{\sqrt{\text{Re}(U_{21})^2 + \text{Re}(U_{11})^2}}{|U|}\right\}$ | (4) |
| Retardance orientation | $\psi = \arctan\left\{\frac{-\text{Re}(U_{12})}{\text{Re}(U_{11})}\right\} - \arctan\left\{\frac{\text{Im}(U_{12})}{\text{Im}(U_{11})}\right\}$ | (5) |
| Diattenuation magnitude | $\Delta T = \frac{D_{11}^2 - D_{22}^2}{D_{11}^2 + D_{22}^2}$ | (6) |
| Diattenuation orientation | $\tau = 0.5 \arctan\left\{\frac{2\,\text{Re}\{W_{11}W_{21}^*\}}{|W_{11}|^2 - |W_{21}|^2}\right\}$ | (7) |
| Diattenuation ellipticity | $\varepsilon = \tan\left\{\frac{1}{2}\arcsin\frac{2\,\text{Im}\{W_{11}W_{21}^*\}}{|W_{11}|^2 + |W_{21}|^2}\right\}$ | (8) |
| Rotation | $R = \arctan\left\{\frac{\text{Re}(U_{12})}{\text{Re}(U_{11})}\right\}$ | (9) |

The above table gives a rough overview of the formulas. Not all particular cases are included.

The imaging errors stemming from the scalar phase are well understood and conveniently described by an expansion of the wavefront (phase over pupil) into Zernike polynomials. Single Zernike polynomials correspond to particular imaging errors.

In principle, the same procedure is possible with respect to the transmission and the rotation. Here again an expansion into scalar Zernike polynomials can be done. Diattenuation and retardance, however, are no scalar quantities: They consist of a magnitude and a direction. For their expansion the Zernike polynomials have to be modified.

1. Scalar Zernike Polynomials

Zernike polynomials are defined on the unit circle. A real function $W(r,\phi)$ on that circle is represented as $$W(r, \varphi) = \sum_{n=0}^{N} \sum_{m=-n}^{n} C_{nm} R_n^{|m|} e^{im\varphi} \qquad (10)$$

$$= \sum_{n=0}^{N} \sum_{m=-n}^{n} A_{nm} U_{nm}$$

$$= \sum_{n=0}^{N} \sum_{m=-n}^{n} A_{nm} R_n^m \begin{cases} \cos m\varphi : m \geq 0 \\ \sin m\varphi : m < 0 \end{cases}$$

where the radial polynomials are given by $$R_n^m(r) = \sum_{s=0}^{(n-m)/2} (-1)^s \frac{(n-s)!}{s!\left(\frac{1}{2}(n+m)-s\right)!\left(\frac{1}{2}(n-m)-s\right)!} r^{n-2s} \qquad (11)$$

$A_{nm}$ denotes the coefficients of the expansion.

For convenience a linear single number scheme can be used. A possible and convenient numbering scheme relates the sub-indices n and m according to the following formulas to the single number j ("ceil(x)"=lowest natural number larger than x)

$$b = \text{ceil}\sqrt{j} \qquad (12)$$

$$a = b^2 - j + 1$$

$$m = \begin{cases} -\frac{a}{2} & a \text{ even} \\ \frac{a-1}{2} & a \text{ odd} \end{cases}$$

$$n = 2(b-1) - |m|$$

The numbering scheme of the fringe Zernikes used here is depicted concisely according to Table 2.

TABLE 2

| j | | | | | | | | | | | | | | | | | | | | | | | | | |
|---|---|---|---|---|---|---|---|---|---|---|---|---|---|---|---|---|---|---|---|---|---|---|---|---|---|
| n | m | | | | | | | | | | | | | | | | | | | | | | | | 0θ |
| | | | | | | | | | | | | | | | | | | | | | | | | | 1 |
| | | | | | | | | | | | | | | | | | | | | | 1θ | | | 0 | 0 |
| | | | | | | | | | | | | | | | | | | | | 2 | | 3 | | 4 | |
| | | | | | | | | | | | | | | | | | 2θ | | | 1 | 1 | 1 | -1 | 2 | 0 |
| | | | | | | | | | | | | | | | | | | | 5 | 6 | | 7 | | 8 | 9 |
| | | | | | | | | | | | | | | 3θ | | | | | 2 | 2 | 2 | -2 | 3 | 1 | 3 | -1 | 4 | 0 |
| | | | | | | | | | | | | 10 | 11 | | 12 | | 13 | | 14 | | 15 | | 16 | |
| | | | | | | | | 4θ | | | | 3 | 3 | 3 | -3 | 4 | 2 | 4 | -2 | 5 | 1 | 5 | -1 | 6 | 0 |
| | | | | | | | 17 | 18 | | 19 | | 20 | | 21 | | 22 | | 23 | | 24 | | 25 | | | |
| | | | | 5θ | | | 4 | 4 | 4 | -4 | 5 | 3 | 5 | -3 | 6 | 2 | 6 | -2 | 7 | 1 | 7 | -1 | 8 | 0 | |
| | | | | 26 | 27 | 28 | 29 | | 30 | | 31 | | 32 | | 33 | | 34 | | 35 | | 36 | | | | |
| 6θ | | | | 5 | 5 | 5 | -5 | 6 | 4 | 6 | -4 | 7 | 3 | 7 | -3 | 8 | 2 | 8 | -2 | 9 | 1 | 9 | -1 | 10 | 0 |
| 37 | 38 | | 39 | | 40 | | 41 | | 42 | | 43 | | 44 | | 45 | | 46 | | 47 | | 48 | | 49 | | |
| 6 | 6 | 6 | -6 | 7 | 5 | 7 | -5 | 8 | 4 | 8 | -4 | 9 | 3 | 9 | -3 | 10 | 2 | 10 | -2 | 11 | 1 | 11 | -1 | 12 | 0 |

2. Jones-Zernike Polynomials

Non-published US-Provisional application U.S. 60/655,563 discloses the representation of the electric field in the pupil plane—i.e. the Jones vectors there—as a superposition of vector modes $V_i(p,q)$ with scalar excitation coefficients:

$$E(p, q) = \sum_i Z_i V_i(p, q) \qquad (13)$$

The expansion of a two-dimensional vector field of M pixels into N vector modes is performed as the expansion of a scalar wavefront into scalar Zernike polynomials. Here, this done by a least square solution of a linear system of equations.

$$\sum_{j=1}^{N} A_{ij} x_j = b_i \quad \text{mit } i = 1, \ldots, M \qquad (14)$$

with $$A_{ij} = \begin{pmatrix} V_j^p(p_i, q_i) \\ V_j^q(p_i, q_i) \end{pmatrix} \qquad (15)$$

$$x_j = Z_j$$

$$b_i = \begin{pmatrix} E_p(p_i, q_i) \\ E_q(p_i, q_i) \end{pmatrix}$$

i.e. the considered optical system is characterized by the coefficients $Z_i$.

3. Pauli-Zernike Polynomials

The decomposition of a Jones pupil into Pauli Spin matrices $$\sigma_0 = \begin{pmatrix} 1 & 0 \\ 0 & 1 \end{pmatrix}, \qquad (16)$$

$$\sigma_1 = \begin{pmatrix} 1 & 0 \\ 0 & -1 \end{pmatrix},$$

$$\sigma_2 = \begin{pmatrix} 0 & 1 \\ 1 & 0 \end{pmatrix},$$

-continued $$\sigma_3 = \begin{pmatrix} 0 & i \\ -i & 0 \end{pmatrix},$$

is described in McGuire, J. P., Jr. and R. A. Chipman: "Polarization aberrations. 1. Rotationally symmetric optical systems", Applied Optics, 1994. 33(22): p. 5080-5100, and in McIntyre, G. R., et al.: "Polarization aberrations in hyper-numerical-aperture projection printing: a comparison of various representations", Journal of Microlithography, Microfabrication and Microsystems, 2006. 5(3): p. 33001-31.

4. Orientators 4.1 Definition

Orientators are introduced here to describe magnitude and orientation of polarization states, retardance or diattenuation in free space. All these quantities can be visualized as shown in FIG. 1 by ellipses with a well defined meaning of the large and small axes, 2A and 2B, respectively (see Table 3 in connection with FIG. 1).

TABLE 3

| Quantity | Large axis | Small axis |
|---|---|---|
| Polarization state | Main linear polarization | Minor linear polarization |
| Retardance | Fast axis | Slow axis |
| Diattenuation | Bright axis | Dark axis |

The orientation angle $\psi$ of the ellipse defines a direction in space. This not a vector because it is defined modulo 180°, i.e. a rotation of 180° returns the ellipse to its original orientation. The inverse direction is obtained by rotation by 90°. These are properties of retardance and diattenuation but also of polarization, provided the ellipticity is also inverted.

Because of that property an orientation can be represented by a vector with doubled directional angle $\psi$. By attaching a magnitude a to it we get an orientator $$\vec{O}(a, \psi) = a \begin{pmatrix} \cos 2\psi \\ \sin 2\psi \end{pmatrix} \quad (17)$$

4.2 Properties (i) Two orientators enclosing an angle of 45° are orthogonal to each other.

Proof: The inner product of two orientators under 45° is obviously zero, because the inner product of two vectors enclosing 90° is zero (ii) The negative (inverse) element to an orientator encloses an angle of 90° with it Proof: The negative element is $$\vec{O}(-a, \psi) = -a \begin{pmatrix} \cos 2\psi \\ \sin 2\psi \end{pmatrix} \quad (18)$$

$$= a \begin{pmatrix} \cos(2\psi + \pi) \\ \sin(2\psi + \pi) \end{pmatrix}$$

$$= a \begin{pmatrix} \cos(2(\psi + \frac{\pi}{2})) \\ \sin(2(\psi + \frac{\pi}{2})) \end{pmatrix}$$

(iii) An orientator represents an orthogonal transformation matrix with an eigenvector along it Proof: A orthogonal transformation matrix with an eigenvector along $\psi$ is given by $$T = \begin{pmatrix} \cos\psi & -\sin\psi \\ \sin\psi & \cos\psi \end{pmatrix} \begin{pmatrix} A & 0 \\ 0 & B \end{pmatrix} \begin{pmatrix} \cos\psi & \sin\psi \\ -\sin\psi & \cos\psi \end{pmatrix} \quad (19)$$

$$= \begin{pmatrix} A\cos^2\psi + B\sin^2\psi & (A-B)\cos\psi\sin\psi \\ (A-B)\cos\psi\sin\psi & A\sin^2\psi + B\cos^2\psi \end{pmatrix}$$

$$= \begin{pmatrix} A\cos^2\psi + B\sin^2\psi & (A-B)\cos\psi\sin\psi \\ (A-B)\cos\psi\sin\psi & A\sin^2\psi + B\cos^2\psi \end{pmatrix}$$

$$= \begin{pmatrix} A + (B-A)\sin^2\psi & (A-B)\cos\psi\sin\psi \\ (A-B)\cos\psi\sin\psi & A + (B-A)\sin^2\psi \end{pmatrix}$$

$$= \begin{pmatrix} A + \frac{B-A}{2}(1-\cos 2\psi) & \frac{A-B}{2}\sin 2\psi \\ \frac{A-B}{2}\sin 2\psi & A + \frac{B-A}{2}(1+\cos 2\psi) \end{pmatrix}$$

$$= \frac{A+B}{2}\begin{pmatrix} 1 & 0 \\ 0 & 1 \end{pmatrix} + \frac{A-B}{2}\begin{pmatrix} \cos 2\psi & \sin 2\psi \\ \sin 2\psi & -\cos 2\psi \end{pmatrix}$$

$$= \frac{A+B}{2}\left(I + \frac{A-B}{A+B} O(\psi)\right)$$

Herein, I denotes the unity matrix and $O(\psi)$ a matrix formed by two orthogonal orientators.

$$O(\psi) = \begin{pmatrix} \cos 2\psi & \sin 2\psi \\ \sin 2\psi & -\cos 2\psi \end{pmatrix} = [\overline{O}(\psi), \overline{O}(\pi - \psi)]] \quad (20)$$

(iv) The product of two transformations with eigenvalues deviating only weakly from one, is given by the sum of the orientators (times the product of the mean value of the eigenvalues)

Proof:

$$T_1 T_2 = \frac{(A_1 + B_1)}{2} \frac{(A_2 + B_2)}{2} \left[I + \frac{A_1 - B_1}{A_1 + B_1} O(\psi_1)\right]\left[I + \frac{A_2 - B_2}{A_2 + B_2} O(\psi_2)\right] \quad (21)$$

$$\approx \frac{(A_1 + B_1)}{2} \frac{(A_2 + B_2)}{2} \left[I + \frac{A_1 - B_1}{A_1 + B_1} O(\psi_1) + \frac{A_2 - B_2}{A_2 + B_2} O(\psi_2)\right]$$

(v) Stokes vector component 1 and 2 (0°-90° linear and 45°-135° linear) correspond to an orientator Proof:

The general form of a stokes vector of intensity one for a degree of polarization DoP, an ellipticity $\chi$ and a direction $\psi$ of the main axis of the polarization ellipse is given by $$\vec{S} = \begin{pmatrix} S_0 \\ S_1 \\ S_2 \\ S_3 \end{pmatrix} = \begin{pmatrix} a \\ DoP\cos 2\chi \cos 2\psi \\ DoP\cos 2\chi \sin 2\psi \\ DoP\sin 2\chi \end{pmatrix} \quad (22)$$

i.e. the vector formed by $S_1$ and $S_2$ is actually an orientator $$\begin{pmatrix} S_1 \\ S_2 \end{pmatrix} = DoP\cos 2\chi \vec{O}(\psi) \quad (23)$$

5. Orientation Zernike Polynomials 5.1 OZP Definition

The orientation Zernike polynomials (="OZP") are an expansion for orientator fields. As in the vector Zernike polynomials the radial and angular part of the vector Zernike polynomials are separated. The radial part is the same as in the scalar ones, the angular part, however, is now an orientator $$\vec{W}_{nm\epsilon} = R_n^{|m|} \vec{\Phi}_{m\epsilon} \quad (24)$$

with m=−n, . . . , n and ε=0 or 1.

Accordingly, an expansion into OZP can be given as $$W = \sum_{n=0}^{N} \sum_{m=-n}^{n} \sum_{\epsilon=0,1} C_{nm\epsilon} R_n^{|m|} \vec{\Phi}_{m\epsilon}.$$

The functional form is the same as for VZP. The interpretation, however, is different: The angular part of the OZP is interpreted as an orientator, i.e. it represents an orientation angle ψ that is half of the angle of the vector.

$$\vec{\Phi}_{m0} = \begin{pmatrix} \cos\frac{m\varphi}{2} \\ -\sin\frac{m\varphi}{2} \end{pmatrix}, \vec{\Phi}_{m1} = \begin{pmatrix} \sin\frac{m\varphi}{2} \\ \cos\frac{m\varphi}{2} \end{pmatrix} \quad (25)$$

This is not the only possible definition of $\vec{\Phi}_{m\epsilon}$. Any two independent linear combinations of $\vec{\Phi}_{m0}$ and $\vec{\Phi}_{m1}$ also represent a valid basis set. Another possible set is outlined in the following:

Let j be the number of a certain scalar Fringe Zernike polynomial, and m≧0 its waviness. Furthermore choose j always to be the smaller index of the two possible values corresponding to its waviness (lets call this Zernike x-wave). For instance for m=1, j could be 2, 7, 14, . . . and for m=2, j could be 5, 12, 21, . . . . Let the corresponding OZP be denoted by OZ=±j. Then the angular parts of the OZP are given by $$\vec{\Phi}_{m0} = \begin{pmatrix} \cos\frac{m\varphi}{2} \\ \mathrm{sgn}(OZ)\sin\frac{m\varphi}{2} \end{pmatrix} \text{ for } OZ = \pm j(x\text{-wave}) \quad (26)$$

and $$\vec{\Phi}_{m1} = \begin{pmatrix} \sin\left(\frac{m\varphi}{2} + \frac{\pi}{4}\right) \\ -\mathrm{sgn}(OZ)\cos\left(\frac{m\varphi}{2} + \frac{\pi}{4}\right) \end{pmatrix} \text{ for } OZ = \pm(j+1)(y\text{-wave}) \quad (27)$$

The term π/4 is inserted in order to make the correspondence between the numbering scheme and the Jones pupils more apparent. If the given OZP represents some retardation, then with this choice, the phase of the $J_{11}$ element of the Jones matrix pupil of this OZP always corresponds to the scalar Zernike with the same Fringe number. A similar analogy holds for an OZP representing some diattenuation.

For the positive x-wave OZP the orientation angle ψ is $$\psi = \arctan\left(\tan\frac{m\varphi}{2}\right) = \frac{m\varphi}{2},$$

whereas for positive y-wave OZP the orientation angle ψ is $$\psi = \arctan\left(-\cot\left(\frac{m\varphi}{2} + \frac{\pi}{4}\right)\right)$$
$$= \frac{\pi}{2} + \frac{m\varphi}{2} + \frac{\pi}{4}$$
$$= \frac{m\varphi}{2} + \frac{3\pi}{4}$$
$$= \frac{m\varphi}{2} - \frac{\pi}{4},$$

since ψ is π-periodic. Hence the orientation between an x-wave and y-wave OZP differs by 45°.

5.2 Depiction of the First OZP

The first OZP looks the illustration in FIG. 2.

Correspondence of OPZ and Jones Pupils

As mentioned above, the numbering scheme of the OZP is chosen such that for a given OZ number, the Jones matrix element $J_{11}$ corresponds to the scalar Fringe Zernike Z=|OZ|. The sign of the OZP shows up in the offdiagonal elements.

The correspondence between Retardation Orientation Zernike polynomials and Jones pupil is shown in FIG. 3.

Rotational Symmetry of the OZP

The OZP show rotational symmetry of various degrees (OZ 2 for instance, is threefold and OZ 6 completely rotational symmetrical). For the rotational symmetry, the difference between the orientation ψ and the azimuthal angle φ (that varies linearly from 0 to 2π)

$$\Delta(\varphi) = \varphi - \psi(\varphi) \quad (28)$$

is the determining quantity. Provided, 2π is an integer multiple of Δ, the number of symmetry-axes (the "foldness" is $$k = \frac{\Delta(\varphi = 2\pi)}{\pi} \quad (29)$$

Substituting for ψ the orientation of the OZP yields $$k = \frac{2\pi + \frac{m2\pi}{2}}{\pi} = 2 + m \quad (30)$$

Accordingly, the number of symmetry axes of an OZP for azimuthal index m is $$k = 2 + m \quad (31)$$

For the first OZP we get

| j | 1 | −1 | 2 | −2 | 3 | −3 | 4 | −4 | 5 | −5 | 6 | −6 |
|---|---|----|---|----|---|----|---|----|---|----|---|----|
| m | 0 | 0  | 1 | 1  | −1| −1 | 0 | 0  | 2 | 2  | −2| −2 |
| k | 2 | 2  | 3 | 3  | 1 | 1  | 2 | 2  | 4 | 4  | 0 | 0  |

The symmetry properties of the OZP can be summarized as follows:

(i) The spherical terms (==1, 4, 9, 16, . . . ) are two-fold symmetrical
(ii) The symmetry of OZP of the same group differs by 2m
(iii) OZP of indices of identical magnitude have the same number of symmetry axes.

The Spin-Number of an OZP

The rotational symmetry follows from the rotation of the orientation while following a closed curve around the azimuth. OZ1 for instance, does not rotate at all. OZ 2, however, performs a 180° rotation following a path once around the pupil. For OZ-2 this rotation is also 180°, but in the opposite direct ion. So we can assign OZ1 a spin of 0, OZ2 a spin of 0.5 (the orientation rotated counterclockwise) and OZ-2 a spin of −0.5 (clockwise rotation of orientation). It turns out that the spin number is given by the index m according to $$s = \frac{m}{2} \quad (32)$$

Summary of Indices of the OZP

In Table 4 the indices assigned to orientation Zernike polynomials are summarized.

TABLE 4

| Quantity | symbol | formula | examples | | | | | | | | | | | |
|---|---|---|---|---|---|---|---|---|---|---|---|---|---|---|
| Number | j | — | 1 | −1 | 2 | −2 | 3 | −3 | 4 | −4 | 5 | −5 | 6 | −6 |
| Azimuth index | m | | 0 | 0 | 1 | −1 | 1 | −1 | 0 | 0 | 2 | −2 | 2 | −2 |
| Radial index | n | | 0 | 0 | 1 | 1 | 1 | 1 | 2 | 2 | 2 | 2 | 2 | 2 |
| Spin | s | $s = \frac{m}{2}$ | 0 | 0 | $\frac{1}{2}$ | $-\frac{1}{2}$ | $\frac{1}{2}$ | $-\frac{1}{2}$ | 0 | 0 | 1 | −1 | 1 | −1 |
| Foldness | f | f = 2 − m | 2 | 2 | 1 | 3 | 1 | 3 | 2 | 2 | 0 | 4 | 0 | 4 |

Rotation of a Single OZP

This section shows that the rotation of a single OZP is given by a superposition of OZP of the same index m. This behavior is in accordance with scalar Zernike polynomials. The amplitude of any OZP is independent of the azimuth. Therefore it is sufficient to consider the vector containing the angular dependence alone.

$$\vec{\Phi}_{m0} = \begin{pmatrix} \cos\frac{m\psi}{2} \\ -\sin\frac{m\psi}{2} \end{pmatrix}, \vec{\Phi}_{m1} = \begin{pmatrix} \sin\frac{m\psi}{2} \\ \cos\frac{m\psi}{2} \end{pmatrix} \quad (33)$$

Rotation of the orientator for $\epsilon=0$ yields with $\cos(\alpha+\beta)=\cos \alpha \cos \beta - \sin \alpha \sin \beta$ and $\sin(\alpha+\beta)=\sin \cos \beta + \cos \alpha \sin \beta$ $$\vec{\Phi}_{m0}(\psi + \Delta\psi) = \begin{pmatrix} \cos\frac{m(\psi+\Delta\psi)}{2} \\ -\sin\frac{m(\psi+\Delta\psi)}{2} \end{pmatrix} \quad (34)$$

$$= \cos\frac{m\Delta\psi}{2}\begin{pmatrix} \cos\frac{m\psi}{2} \\ -\sin\frac{m\psi}{2} \end{pmatrix} - \sin\frac{m\Delta\psi}{2}\begin{pmatrix} \sin\frac{m\psi}{2} \\ \cos\frac{m\psi}{2} \end{pmatrix}$$

i.e.

$$\vec{\Phi}_{m0}(\psi + \Delta\psi) = \cos\frac{m\Delta\psi}{2}\vec{\Phi}_{m0} - \sin\frac{m\Delta\psi}{2}\vec{\Phi}_{m1} \quad (35)$$

Rotation of the orientator for $\epsilon=1$ yields a similar result $$\vec{\Phi}_{m0}(\psi + \Delta\psi) = \begin{pmatrix} \sin\frac{m(\psi+\Delta\psi)}{2} \\ \cos\frac{m(\psi+\Delta\psi)}{2} \end{pmatrix} \quad (36)$$

$$= \cos\frac{m\Delta\psi}{2}\begin{pmatrix} \sin\frac{m\psi}{2} \\ \cos\frac{m\psi}{2} \end{pmatrix} + \sin\frac{m\Delta\psi}{2}\begin{pmatrix} \cos\frac{m\psi}{2} \\ -\sin\frac{m\psi}{2} \end{pmatrix}$$

i.e.

$$\vec{\Phi}_{m1}(\psi + \Delta\psi) = \cos\frac{m\Delta\psi}{2}\vec{\Phi}_{m1} + \sin\frac{m\Delta\psi}{2}\vec{\Phi}_{m0} \quad (37)$$

Putting the last two results together we obtain for a rotation of a linear combination of the angular parts with $\epsilon=0$ and $\epsilon=1$ (=positive and negative index in the linear scheme)

$$a\vec{\Phi}_{m0}(\psi + \Delta\psi) + b\vec{\Phi}_{m1}(\psi + \Delta\psi) = \quad (38)$$

$$\left(a\cos\frac{m\Delta\psi}{2} + b\sin\frac{m\Delta\psi}{2}\right)\vec{\Phi}_{m0} + \left(b\cos\frac{m\Delta\psi}{2} - a\sin\frac{m\Delta\psi}{2}\right)\vec{\Phi}_{m1}$$

Because of this simple relationship it is sufficient for the following examples to consider one azimuthal position only.

Grouping of OZP

Figure 4:
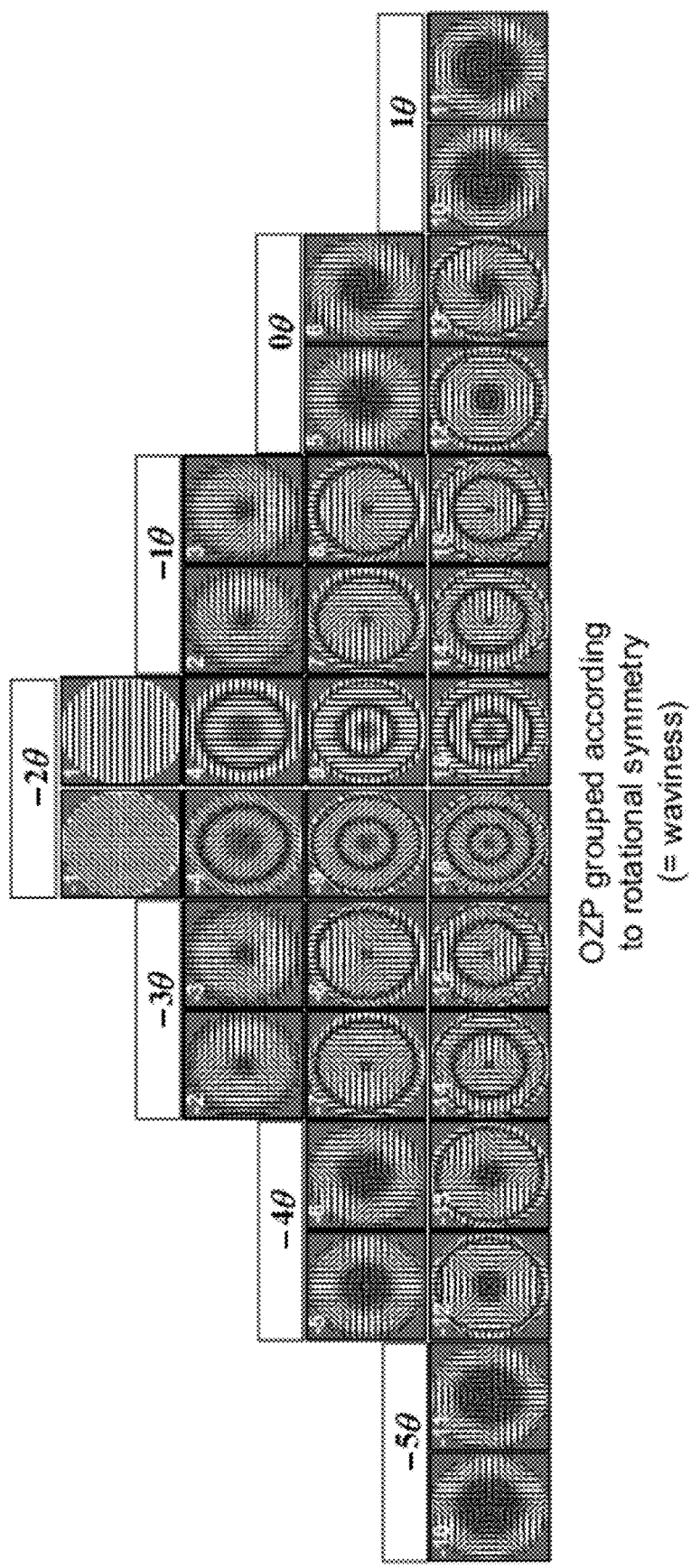
FIG. 4 shows OZP grouped according to rotational symmetry (waviness)

Using the symmetry properties together with the indices derived above, the disclosure suggests to group the OZP as explained in the following with respect to FIG. 4:

The waviness—denoted on top of the columns—becomes an integer number, i.e. it is positive and negative. The sign depends on the handiness of the rotation of the orientators with respect to the azimuth (the spin number). This can be clockwise or counterclockwise. The grouping of the OZP desirably takes the handiness into account, because the superposition is completely different for different handiness.

Relation to Pauli Pupils

There is a close relationship to the Zernike expansion of the Jones-pupil decomposed into Pauli matrices as will be shown in the following. An orthogonal transformation matrix T was written in (3) as $$T = \frac{A+B}{2}\begin{pmatrix} 1 & 0 \\ 0 & 1 \end{pmatrix} + \frac{A-B}{2}\begin{pmatrix} \cos 2\psi & \sin 2\psi \\ \sin 2\psi & -\cos 2\psi \end{pmatrix} \quad (39)$$

$$= \frac{A+B}{2}\left(I + \frac{A-B}{A+B}O(\psi)\right)$$

With the definition of the Pauli-matrices $$\sigma_0 = \begin{pmatrix} 1 & 0 \\ 0 & 1 \end{pmatrix}, \sigma_1 = \begin{pmatrix} 1 & 0 \\ 0 & -1 \end{pmatrix}, \sigma_2 = \begin{pmatrix} 0 & 1 \\ 1 & 0 \end{pmatrix}, \sigma_3 = \begin{pmatrix} 0 & i \\ -i & 0 \end{pmatrix} \quad (40)$$

it becomes $$T = \frac{A+B}{2}\sigma_0 + \frac{A-B}{2}(\cos(2\psi)\sigma_1 + \sin(2\psi)\sigma_2) \quad (41)$$

From a comparison of equations (39) and (41) it is obvious, that the Zernike decomposition of the prefactors of the Pauli matrices is closely related to the Orientation Zernike decomposition. To provide the equations we consider the Pauli decomposition of an OZP-group $$W_j = W_{nm0} = \begin{pmatrix} C_n^m & S_n^m \\ S_n^m & -C_n^m \end{pmatrix} = C_n^m \sigma_1 + S_n^m \sigma_2,$$

$$W_{j+1} = W_{n-m0} = \begin{pmatrix} C_n^m & -S_n^m \\ -S_n^m & -C_n^m \end{pmatrix} = C_n^m \sigma_1 - S_n^m \sigma_2,$$

$$W_{-j} = W_{nm1} = \begin{pmatrix} S_n^m & C_n^m \\ C_n^m & -S_n^m \end{pmatrix} = S_n^m \sigma_1 + C_n^m \sigma_2$$

$$W_{-j-1} = W_{n-m1} = \begin{pmatrix} -S_n^m & C_n^m \\ C_n^m & S_n^m \end{pmatrix} = -S_n^m \sigma_1 + C_n^m \sigma_2$$

(42)

It is sufficient to consider a single group. We denote the spectrum of the OZP by $o_j$ ($=-\infty \ldots \infty$), the spectrum of $\sigma 1$ by $s_j$ (($=0,\ldots,\infty$) and the spectrum of $\sigma 2$ by $t_j$ (($j=0,\ldots,\infty$). That yields $$o_j = s_j + t_{j+1},$$

$$o_{j+1} = s_j - t_{j+1},$$

$$o_{-j} = s_{j+1} + t_j,$$

$$o_{-j-1} = -s_{j+1} + t_j, \quad (43)$$

The inversion is straight forward $$s_j = \frac{o_j + o_{j+1}}{2} \quad (44)$$

$$s_{j+1} = \frac{o_{-j} - o_{-j-1}}{2},$$

$$t_j = \frac{o_j - o_{j+1}}{2},$$

$$t_{j+1} = \frac{o_{-j} + o_{-j-1}}{2},$$

For the terms with rotational symmetry n=0 (i.e. $S_0^m$=0) we get the simple relationship $$o_j = s_j$$

$$o_{-j} s_{j+1} \quad (45)$$

Example 1

Optical System

Figure 5:
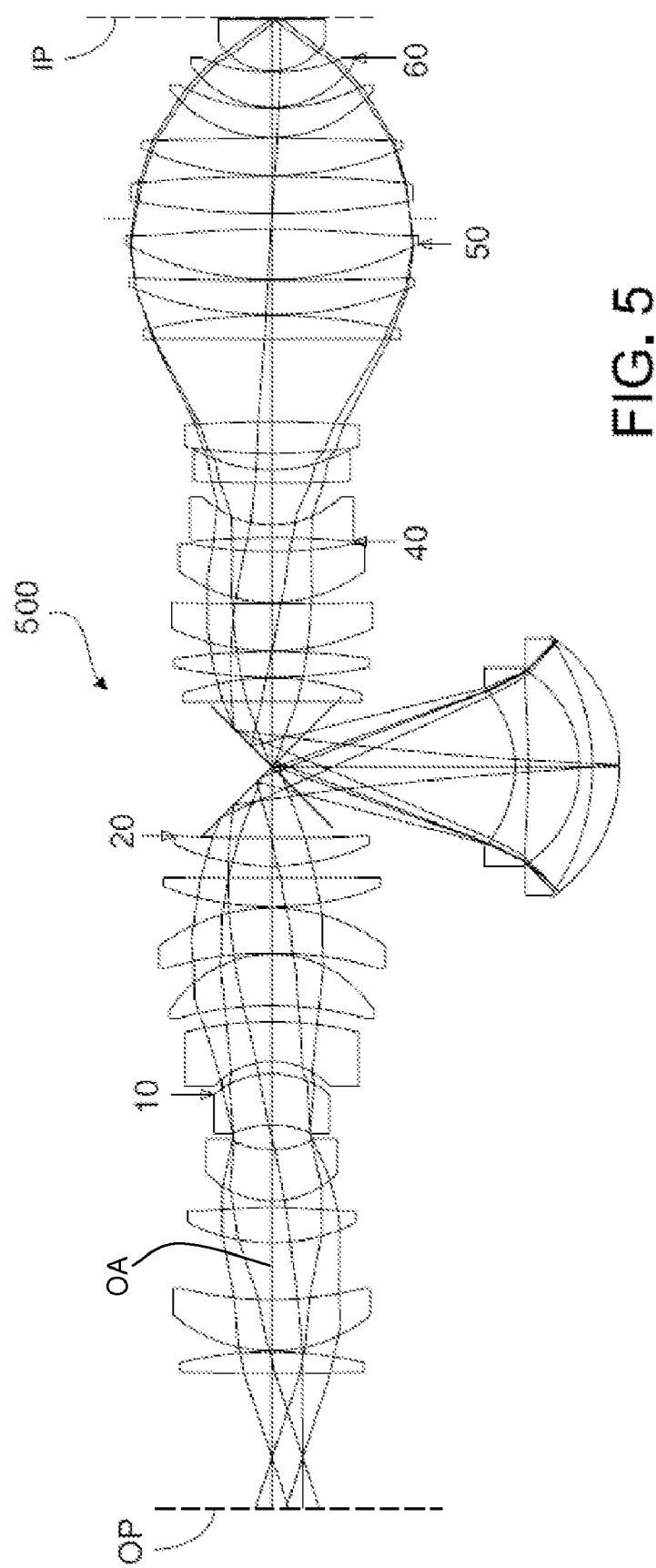
FIG. 5 shows a meridional section of a microlithography projection lens

As an illustrative example, FIG. 5 shows a meridional section of a microlithography projection lens which is also disclosed in WO/2004/019128 A2 (see FIG. 19 and Table 9, 10 of that publication). This projection lens 500 is a catadioptrical projection lens which includes, along an optical system axis OA and between an object (or reticle) plane OP and an image (or wafer) plane IP, a first refractive subsystem, a second catadioptric subsystem and a third refractive subsystem, and is also referred to as a RCR-system ("refractive-catadoptrical-refractive").

The projection lens 500 has a numerical aperture (NA) of 1.3, an image field of 26 mm, 4-times demagnification and an operational wavelength of 193 nm.

The simulated effects include the antireflection coatings, the high-reflection coatings and the volume absorption of $SiO_2$.

Jones-Pupil Polar Decomposition of Jones Pupil and Pauli Decomposition

Figure 6:
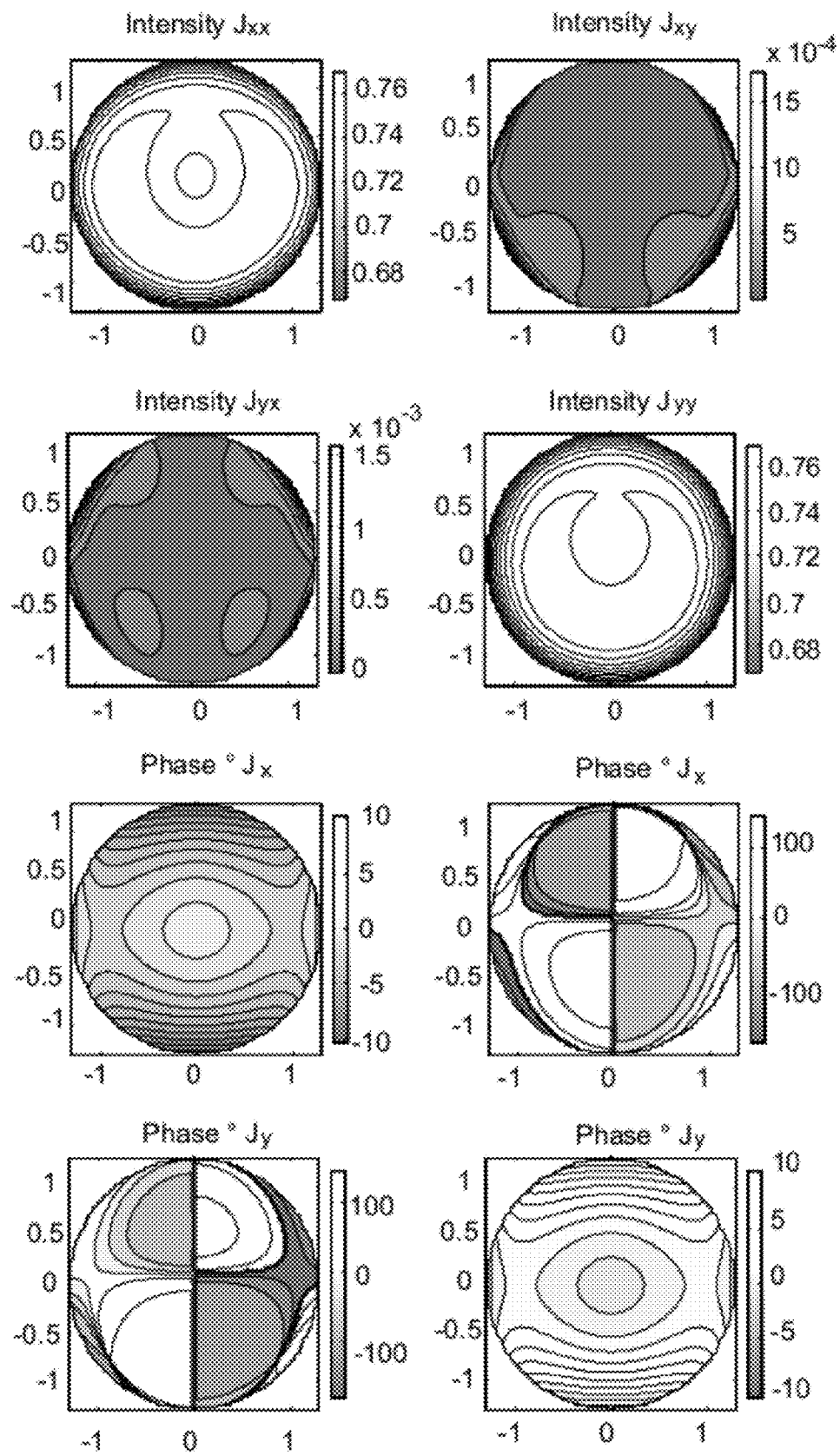
FIG. 6 illustrates a Jones pupil.
Figure 7:
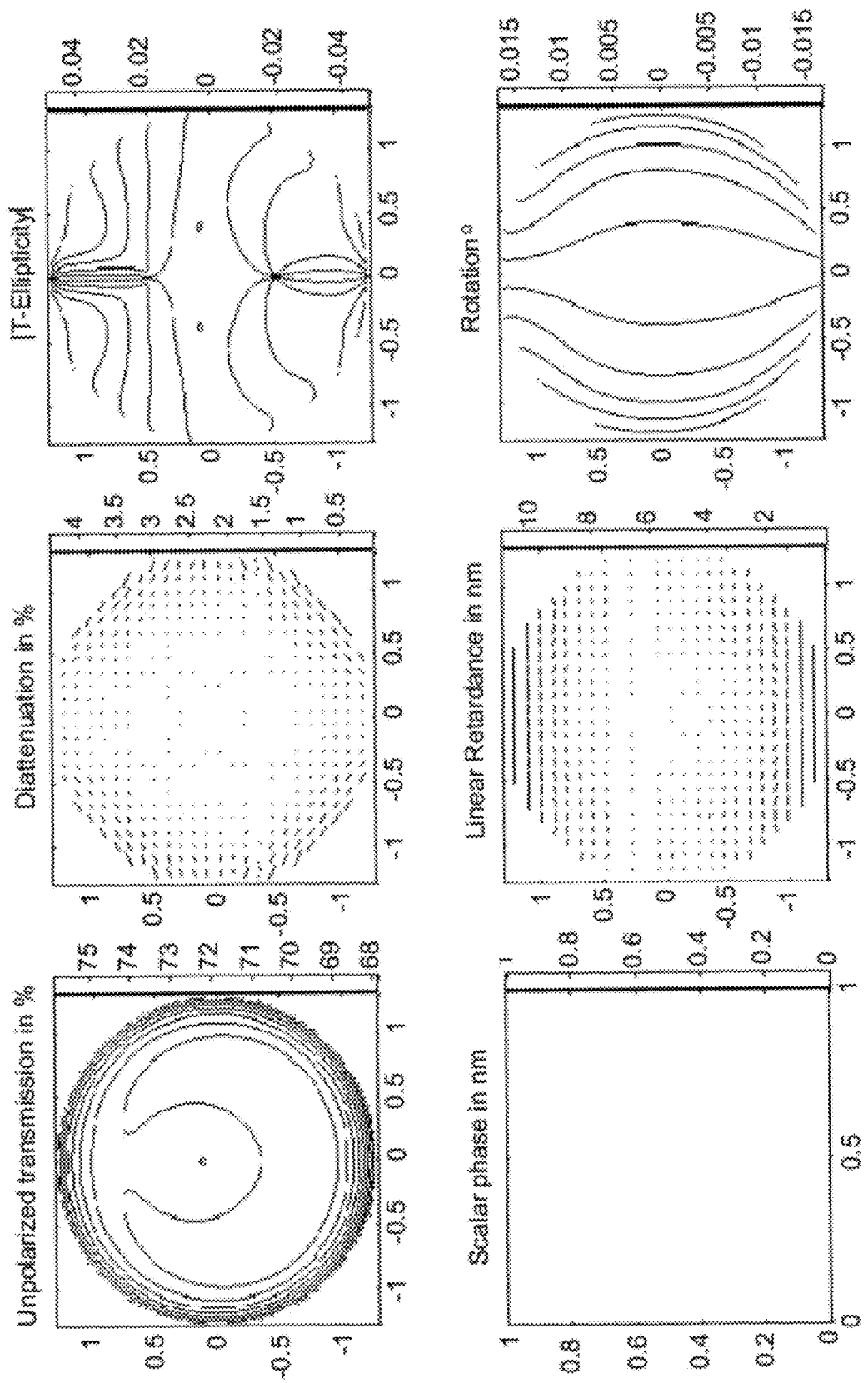
FIG. 7 shows pupils resulting from the polar decomposition using the singular value decomposition results.
Figure 8:
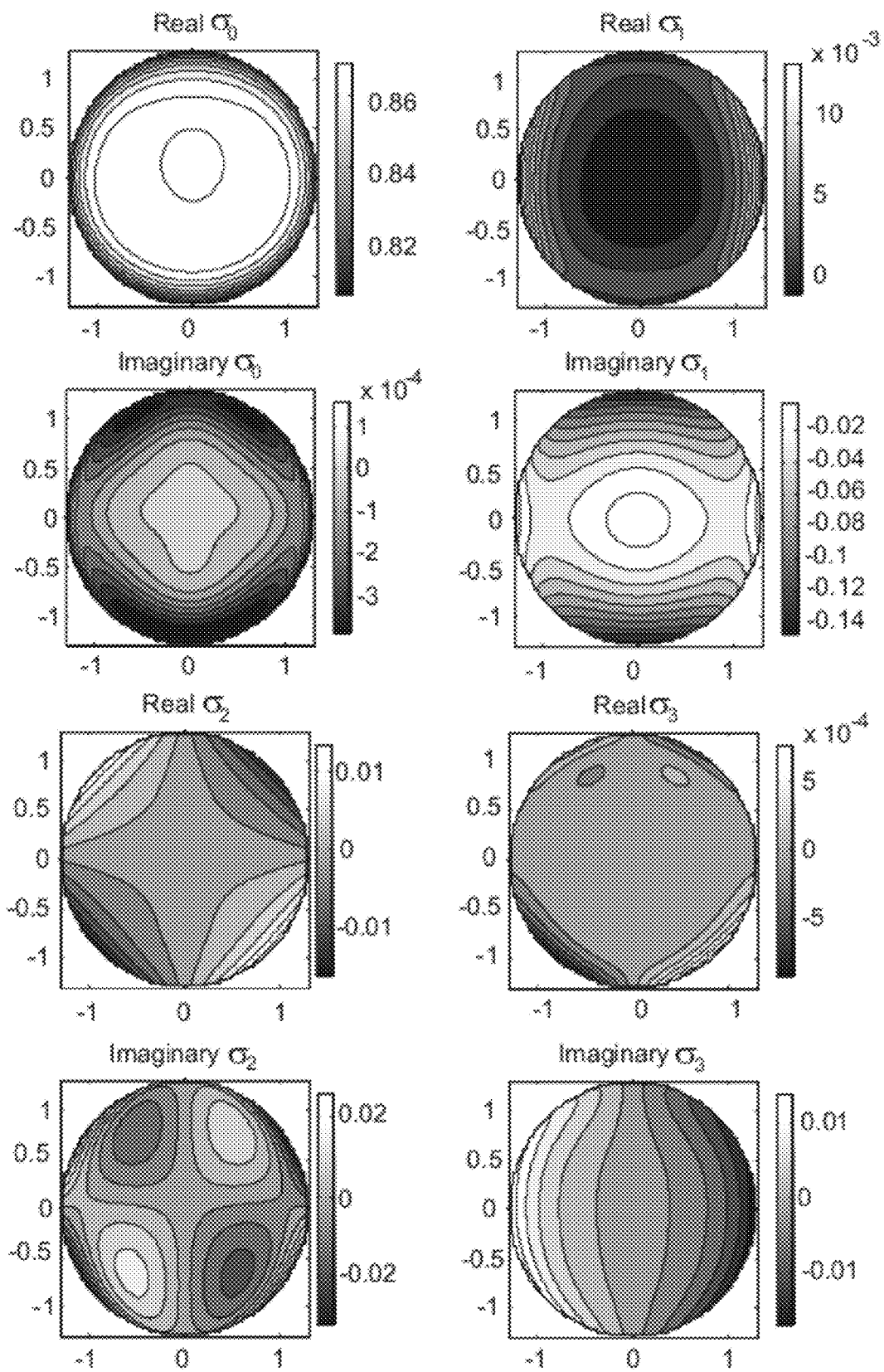
FIG. 8 shows the complex pupils after Pauli decomposition.

The Jones pupil is illustrated in FIG. 6. The polar decomposition using the singular value decomposition results in the following pupils shown in FIG. 7. The complex pupils after Pauli decomposition are shown in FIG. 8.

Figure 9:
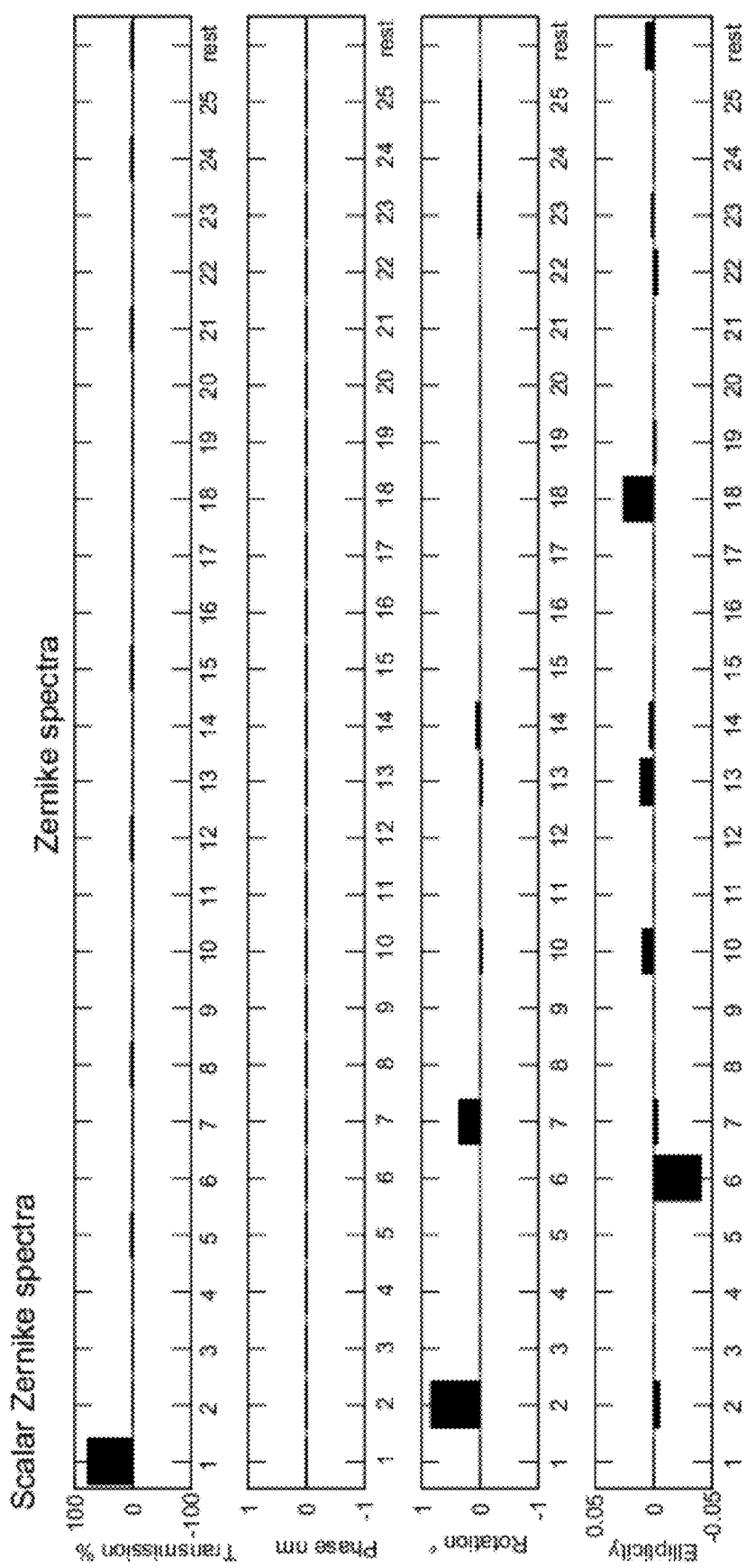
FIG. 9 shows the scalar Zernike spectra.
Figure 10:
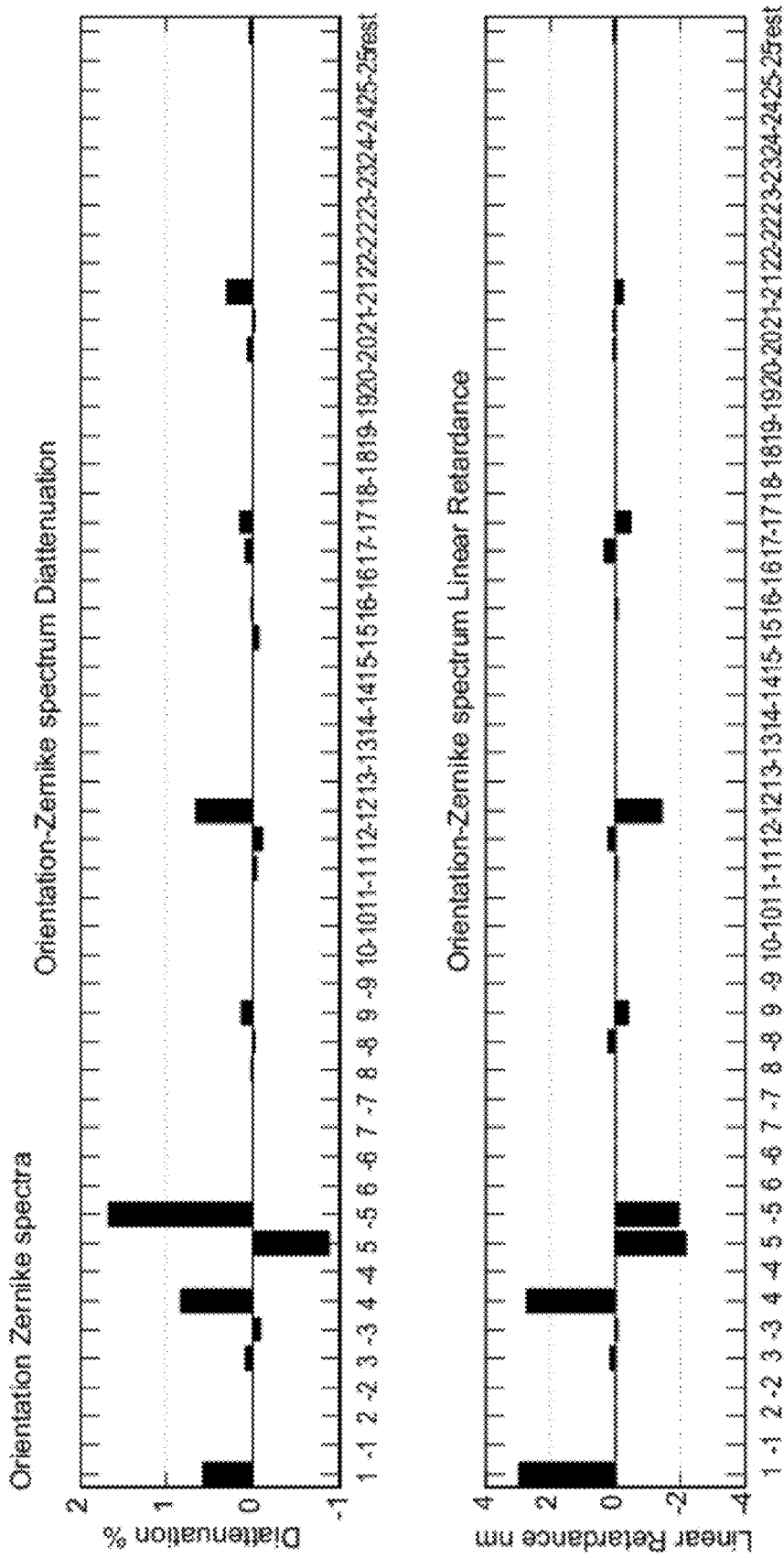
FIG. 10 shows the orientation Zernike spectra.

The scalar Zernike spectra are shown in FIG. 9, while the orientation Zernike spectra are shown in FIG. 10.

As can be gathered from FIG. 10, the OZP being the most significant for the diattenuation is the OZP for which j=−5, followed up by the OZP's for j=5, j=4, j=−12 and j=1. Further OZP's which still give (relatively small) contributions to diattenuation are the OZP's for j=3, j=−3, j=8, j=−8, j=9, j=−11, j=12, j=−15, j=16, j=17, j=−17, j=−20, j=21 and j=−21.

As can also be gathered from FIG. 10, the OZP being the most significant for the retardance is the OZP for which j=1, followed up by the OZP's for j=4, j=5, j=−5 and j=−12. Further OZP's which still give (relatively small) contributions to retardance are the OZP's for j=3, j=−3, j=−8, j=9, j=−11, j=12, j=16, j=17, j=−17, j=−20, j=21 and j=−21.

Example 2

Optical System

Figure 11:
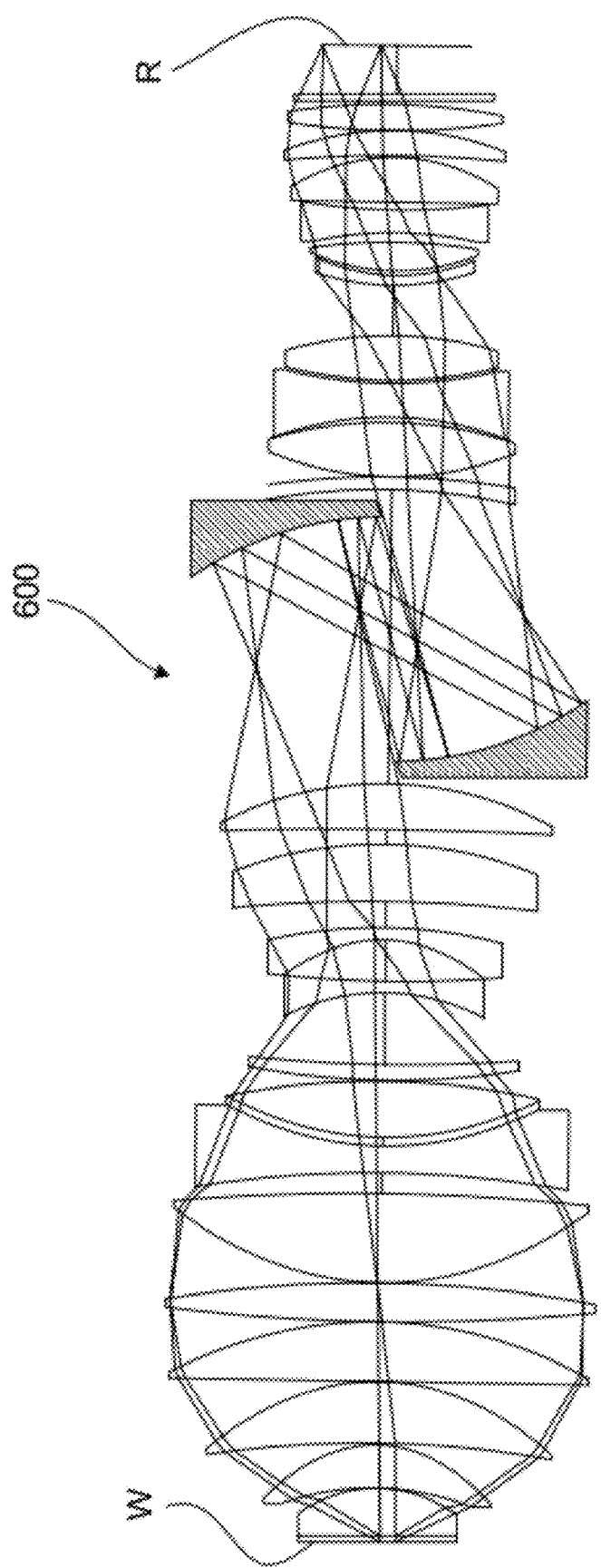
FIG. 11 shows a two-mirror design.

FIG. 11 shows a further example of a so-called "2M design" ("two-mirror design"). The layout of the projection objective 600 is also disclosed in WO 2007/086220 A1 (see FIG. 4 and Table 1 of that publication). The projection objective 600 is rotationally symmetric, has one straight optical axis common to all refractive and reflective optical components and has two concave mirrors. The concave mirrors are both constructed and illuminated as off-axis sections of axially symmetric surfaces. The projection objective 600 is designed as an immersion objective for λ=193 nm having an image side numerical aperture NA=1.3 when used in conjunction with a high index immersion fluid between the exit surface of the objective closest to the image plane and the image plane. Calculations of optical properties have been performed for operation with a rectangular effective image field with size 26 mm*5.5 mm offset by 2.57 mm from the optical axis.

Each of the entry and exit surfaces of the transparent optical elements in the objective 600 of FIG. 11 is provided with an antireflection (AR) structure effective to reduce reflection losses and thereby to increase transmittance of the coated surface. The concave mirror surfaces are coated with high reflectance (HR) reflective coatings. As a conventional antireflection (AR) structure, the AR structure disclosed in U.S. Pat. No. 5,963,365 is used (see embodiment 1 of U.S. Pat. No. 5,963,365).

Then, the thicknesses of the AR structures in the above design have been optimized with respect to the field dependency of the OZP's as discussed in the following in more detail. Hereto, a suitable variation of the thickness with respect to the lens height (with respect to the optical system axis, i.e. the lens radius) has been selected. The thickness of the AR structure can be described by the following polynomial:

$$d(h) = d_0 * (a_1 + a_2 * h + a_3 * h^2 + a_4 * h^3 + a_5 * h^4 + a_6 * h^5 + a_7 * h^6) \quad (46)$$

Accordingly, the thickness of the AR structures after optimization can be described by appropriate values of the coefficients in the above equation (46), wherein the respective values for the optimized design are given below in Table 5. In equation (46), $d_0$ denotes the nominal thickness of the respective AR layer in line with the embodiment 1 of U.S. Pat. No. 5,963,365, so that this nominal thickness is multiplied by a factor according to equation (46).

As to the HR layer, the parameters of the optimized structure can be gathered from Table 6.

TABLE 6

| Partial Layer No. | thickness | Refractive number | Absorption | Material |
|---|---|---|---|---|
| 1 | 40.92 | 1.7 | 3.20E−03 | Al2O3 |
| 2 | 37.2 | 1.41 | 1.00E−04 | AlF3 |
| 3 | 26.97 | 1.7 | 3.20E−03 | Al2O3 |
| 4 | 37.2 | 1.41 | 1.00E−04 | AlF3 |
| 5 | 26.97 | 1.7 | 3.20E−03 | Al2O3 |
| 6 | 37.2 | 1.41 | 1.00E−04 | AlF3 |
| 7 | 26.04 | 1.7 | 3.20E−03 | Al2O3 |
| 8 | 38.13 | 1.41 | 1.00E−04 | AlF3 |
| 9 | 26.04 | 1.7 | 3.20E−03 | Al2O3 |
| 10 | 38.13 | 1.41 | 1.00E−04 | AlF3 |
| 11 | 26.04 | 1.7 | 3.20E−03 | Al2O3 |
| 12 | 38.13 | 1.41 | 1.00E−04 | AlF3 |
| 13 | 26.04 | 1.7 | 3.20E−03 | Al2O3 |
| 14 | 39.06 | 1.41 | 1.00E−04 | AlF3 |

TABLE 5

| Surf. | a1 | a2 | a3 | a4 | a5 | a6 | a7 |
|---|---|---|---|---|---|---|---|
| S1 | 1.00E+00 | 7.28E−05 | 7.21E−07 | 1.75E−09 | −9.94E−11 | −2.94E−12 | −5.93E−14 |
| S2 | 1.00E+00 | 7.80E−05 | 7.00E−07 | 9.92E−10 | −1.06E−10 | −2.88E−12 | −5.56E−14 |
| S3 | 1.01E+00 | 7.29E−05 | 5.36E−07 | −7.05E−10 | −1.10E−10 | −2.59E−12 | −4.69E−14 |
| S4 | 9.95E−01 | 3.92E−05 | 5.36E−07 | 3.73E−09 | 1.63E−12 | −4.77E−13 | −1.11E−14 |
| S5 | 1.01E+00 | 1.10E−04 | 5.41E−07 | −3.36E−09 | −1.48E−10 | −2.90E−12 | −4.70E−14 |
| S6 | 9.95E−01 | 5.48E−05 | 5.21E−07 | 2.38E−09 | −1.35E−11 | −5.60E−13 | −1.05E−14 |
| S7 | 1.01E+00 | 1.69E−04 | 6.92E−07 | −8.01E−09 | −2.70E−10 | −5.16E−12 | −8.45E−14 |
| S8 | 9.69E−01 | −4.61E−05 | 1.12E−06 | 2.83E−08 | 5.31E−10 | 9.09E−12 | 1.54E−13 |
| S9 | 9.62E−01 | −7.24E−05 | 1.64E−06 | 4.17E−08 | 8.04E−10 | 1.46E−11 | 2.63E−13 |
| S10 | 9.80E−01 | 1.21E−04 | 2.23E−06 | 2.79E−08 | 3.47E−10 | 4.62E−12 | 6.70E−14 |
| 511 | 9.73E−01 | 5.48E−05 | 2.56E−06 | 4.91E−08 | 8.61E−10 | 1.52E−11 | 2.77E−13 |
| S12 | 9.55E−01 | −7.92E−05 | 4.17E−06 | 1.08E−07 | 2.44E−09 | 5.61E−11 | 1.34E−12 |
| S13 | 9.58E−01 | −3.52E−05 | 4.58E−06 | 1.12E−07 | 2.50E−09 | 5.75E−11 | 1.37E−12 |
| S14 | 9.76E−01 | 3.95E−05 | 2.91E−06 | 7.48E−08 | 1.78E−09 | 3.66E−11 | 7.77E−13 |
| S15 | 9.71E−01 | −5.93E−05 | 1.45E−06 | 3.60E−08 | 5.67E−10 | 7.91E−12 | 1.02E−13 |
| S16 | 1.02E+00 | 2.31E−04 | 7.74E−07 | −1.61E−08 | −4.49E−10 | −7.91E−12 | −1.21E−13 |
| S17 | 1.01E+00 | 2.25E−04 | 7.91E−07 | −1.51E−08 | −4.26E−10 | −7.49E−12 | −1.14E−13 |
| S18 | 9.87E−01 | −2.20E−04 | −1.03E−06 | 6.67E−09 | 2.62E−10 | 4.40E−12 | 6.08E−14 |
| S19 | 9.92E−01 | −1.91E−04 | −1.09E−06 | 2.49E−09 | 1.84E−10 | 3.37E−12 | 4.78E−14 |
| S20 | 9.97E−01 | 8.01E−05 | 6.77E−07 | 1.81E−09 | −3.48E−11 | −8.35E−13 | −1.29E−14 |
| S21 | 1.01E+00 | 8.40E−05 | 2.68E−07 | −3.55E−09 | −8.30E−11 | −1.16E−12 | −1.38E−14 |
| S22 | 1.01E+00 | 7.83E−05 | 2.14E−07 | −3.70E−09 | −8.03E−11 | −1.09E−12 | −1.28E−14 |
| S23 | 1.00E+00 | 0.00E+00 | 0.00E+00 | 0.00E+00 | 0.00E+00 | 0.00E+00 | 0.00E+00 |
| S24 | 1.00E+00 | 0.00E+00 | 0.00E+00 | 0.00E+00 | 0.00E+00 | 0.00E+00 | 0.00E+00 |
| S25 | 1.01E+00 | 1.03E−05 | −2.09E−09 | −8.46E−10 | −1.56E−11 | −2.01E−13 | −2.22E−15 |
| S26 | 9.99E−01 | 3.78E−06 | 1.01E−07 | 5.54E−10 | −2.73E−13 | −4.23E−14 | −6.36E−16 |
| S27 | 1.01E+00 | 3.84E−05 | 1.30E−07 | −1.04E−09 | −2.78E−11 | −3.84E−13 | −4.41E−15 |
| S28 | 1.01E+00 | 3.11E−05 | 2.36E−07 | 8.20E−10 | −3.61E−12 | −1.10E−13 | −1.49E−15 |
| S29 | 9.97E−01 | 6.65E−05 | 3.28E−07 | −6.04E−10 | −3.51E−11 | −5.76E−13 | −7.79E−15 |
| S30 | 1.01E+00 | 1.67E−04 | 6.47E−07 | −8.61E−09 | −2.54E−10 | −4.48E−12 | −6.89E−14 |
| S31 | 9.96E−01 | 1.01E−04 | 4.75E−07 | −1.66E−09 | −6.72E−11 | −1.09E−12 | −1.50E−14 |
| S32 | 1.02E+00 | 1.50E−05 | −2.33E−06 | −3.86E−08 | −3.60E−10 | −3.90E−13 | 8.15E−14 |
| S33 | 1.01E+00 | 8.51E−05 | −3.32E−08 | −4.57E−09 | −7.59E−11 | −1.04E−12 | −1.35E−14 |
| S34 | 1.00E+00 | 5.29E−05 | −3.39E−08 | −2.36E−09 | −3.53E−11 | −4.53E−13 | −5.48E−15 |
| S35 | 1.02E+00 | 1.02E−04 | −4.47E−08 | −5.52E−09 | −9.03E−11 | −1.18E−12 | −1.43E−14 |
| S36 | 1.01E+00 | 4.44E−05 | 2.12E−08 | −1.90E−09 | −3.30E−11 | −4.43E−13 | −5.41E−15 |
| S37 | 1.01E+00 | 3.69E−05 | −2.94E−08 | −2.02E−09 | −3.14E−11 | −4.06E−13 | −4.84E−15 |
| S38 | 1.01E+00 | 3.79E−05 | 6.05E−09 | −1.46E−09 | −2.40E−11 | −3.05E−13 | −3.51E−15 |
| S39 | 1.01E+00 | 3.77E−05 | −1.98E−08 | −1.43E−09 | −1.92E−11 | −2.11E−13 | −2.14E−15 |
| S40 | 1.02E+00 | 5.34E−05 | −1.14E−07 | −2.53E−09 | −2.61E−11 | −2.32E−13 | −1.94E−15 |
| S41 | 1.00E+00 | 2.77E−05 | −2.79E−08 | −7.73E−10 | −7.94E−12 | −7.33E−14 | −6.60E−16 |
| S42 | 1.01E+00 | 5.38E−05 | −3.82E−08 | −1.89E−09 | −2.15E−11 | −2.05E−13 | −1.85E−15 |
| S43 | 1.00E+00 | 3.02E−05 | −3.51E−08 | −8.96E−10 | −7.96E−12 | −5.85E−14 | −3.74E−16 |
| S44 | 1.01E+00 | 7.07E−05 | −4.93E−08 | −3.04E−09 | −3.58E−11 | −3.48E−13 | −3.18E−15 |
| S45 | 9.98E−01 | 3.87E−05 | 2.67E−08 | −6.45E−10 | −6.88E−12 | −5.09E−14 | −3.00E−16 |
| S46 | 1.03E+00 | 1.90E−04 | 1.33E−07 | −1.04E−08 | −1.93E−10 | −2.76E−12 | −3.63E−14 |
| S47 | 9.95E−01 | 7.00E−05 | 3.39E−07 | 6.15E−10 | −1.26E−11 | −3.03E−13 | −5.40E−15 |
| S48 | 1.09E+00 | 7.94E−04 | 1.14E−06 | −1.24E−07 | −3.65E−09 | −8.08E−11 | −1.63E−12 |

TABLE 6-continued

| Partial Layer No. | thickness | Refractive number | Absorption | Material |
|---|---|---|---|---|
| 15 | 25.11 | 1.7 | 3.20E−03 | Al2O3 |
| 16 | 39.99 | 1.41 | 1.00E−04 | AlF3 |
| 17 | 25.11 | 1.7 | 3.20E−03 | Al2O3 |
| 18 | 37.2 | 1.41 | 1.00E−04 | AlF3 |
| 19 | 6.51 | 1.68 | 2.10E−04 | LaF3 |
| 20 | 20.46 | 1.7 | 3.20E−03 | Al2O3 |
| 21 | 38.13 | 1.41 | 1.00E−04 | AlF3 |
| 22 | 8.37 | 1.68 | 2.10E−04 | LaF3 |
| 23 | 18.6 | 1.7 | 3.20E−03 | Al2O3 |
| 24 | 38.13 | 1.41 | 1.00E−04 | AlF3 |
| 25 | 9.3 | 1.68 | 2.10E−04 | LaF3 |
| 26 | 16.74 | 1.7 | 3.20E−03 | Al2O3 |
| 27 | 39.06 | 1.41 | 1.00E−04 | AlF3 |
| 28 | 28.83 | 1.68 | 2.10E−04 | LaF3 |
| 29 | 38.13 | 1.41 | 1.00E−04 | AlF3 |
| 30 | 28.83 | 1.68 | 2.10E−04 | LaF3 |
| 31 | 39.99 | 1.41 | 1.00E−04 | AlF3 |
| 32 | 26.04 | 1.68 | 2.10E−04 | LaF3 |
| 33 | 39.06 | 1.41 | 1.00E−04 | AlF3 |

Figure 12:
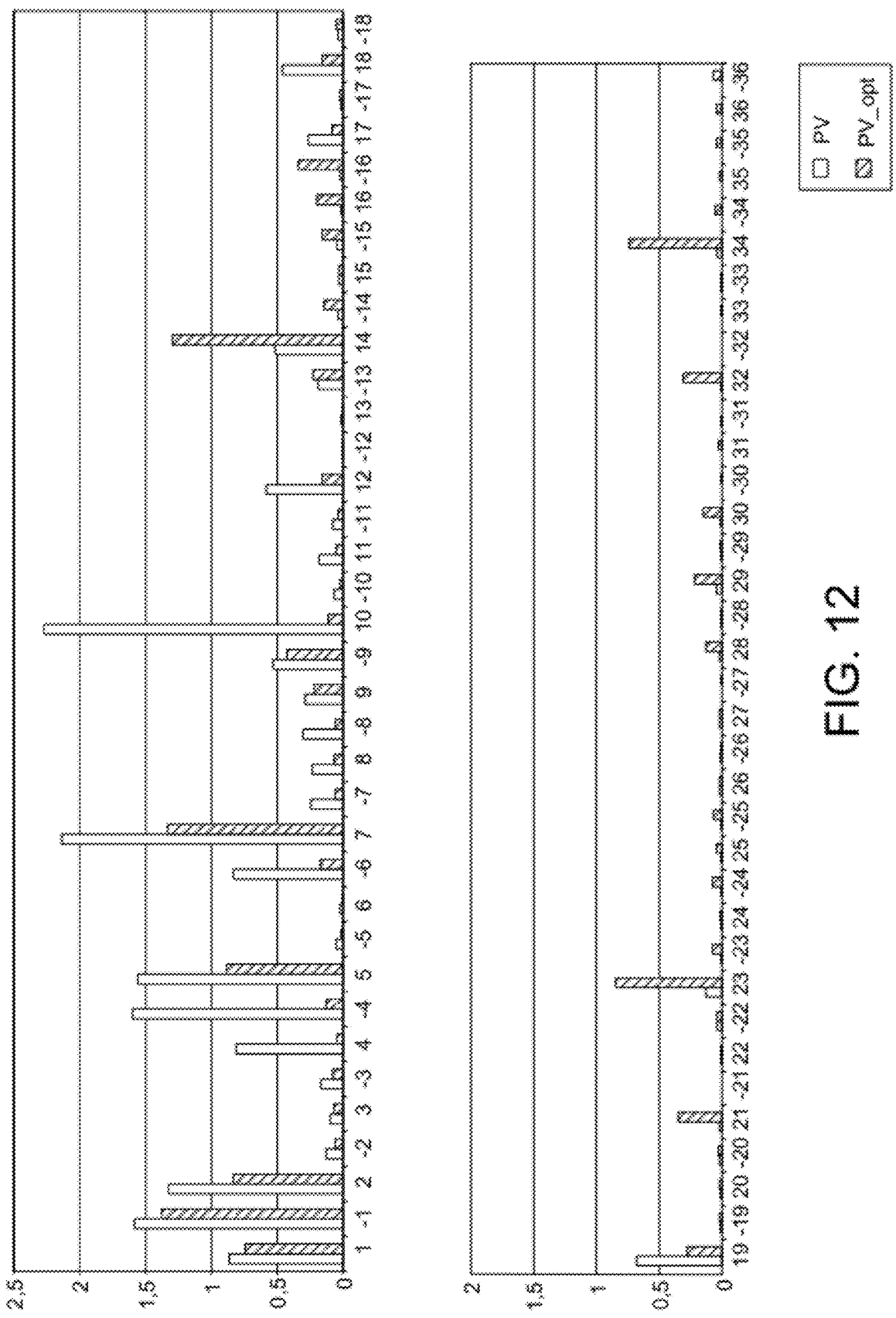
FIG. 12 shows the PV values of the OZP's for diattenuation.
Figure 13:
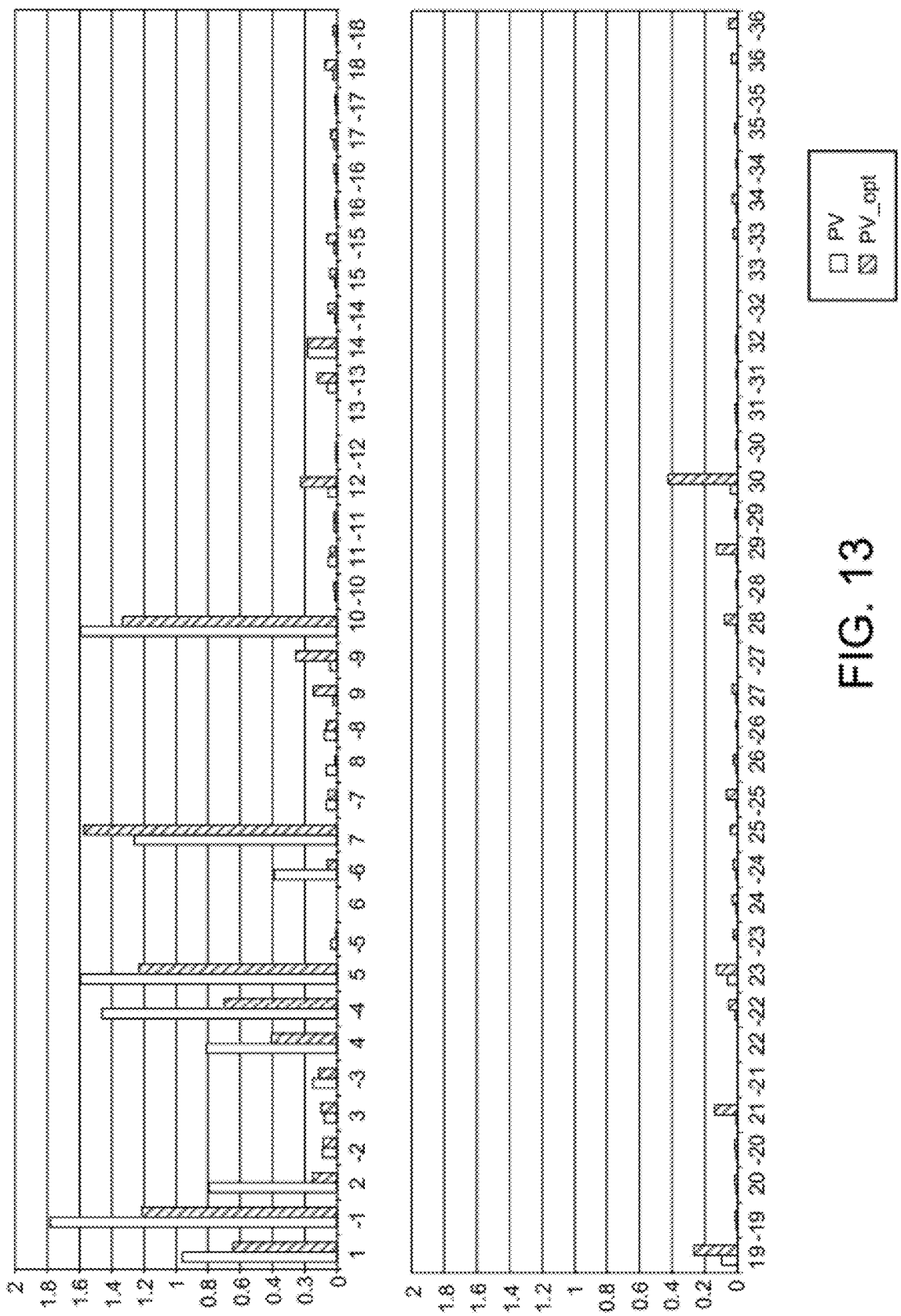
FIG. 13 shows the PV values of the OZP's for retardance.

FIG. 12 shows, in order to demonstrate the field dependency of the OZP's before and after optimization, the PV values (PV="Peak-to-Value") of the OZP's for diattenuation, while FIG. 13 shows the same for retardation. It can be seen in both figures that after optimization the PV values have been significantly reduced for most OZP's.

As can be gathered from Tables 7-10 shown below, relevant lithographic parameters as the CD variation (=variation of critical dimension, i.e. deviation from the nominal structure width or dimension) between the center of the field and the edge of the field, HV (=differences between horizontal and vertical lines), OVL (=overlay, i.e. lateral displacement or deviation from the desired position) and telecentry have been significantly improved as a result of the optimization of the AR-structures in the above design with respect of the field dependency of the OZP's.

These lithographic parameters have been determined for an annular setting, wherein the ratio between inner and outer radius in pupil coordinates was 0.72/0.97 and wherein a so-called XY-polarization (also referred to as "quasi-tangential polarized setting"), a numerical aperture NA=1.3, an operating wavelength λ=193 nm and a desired CD of 45 nm on the wafer have been used. In order to obtain the results of Table 7-10, the aerial image in resist has been evaluated using a simple threshold model.

TABLE 7

| pitch | CD [nm] before optimization | CD [nm] after optimization | Difference Δ |
|---|---|---|---|
| 90 | 0.13717381 | 0.0532614 | 0.08391241 |
| 110 | −0.52389101 | −0.34792701 | 0.17596401 |
| 140 | −0.6279239 | −0.38442915 | 0.24349475 |
| 180 | −0.42093159 | −0.25616406 | 0.16476753 |
| 250 | −0.33736285 | −0.18033748 | 0.15702538 |
| 500 | 0.17847836 | 0.18173183 | −0.00325347 |

TABLE 8

| pitch | HV [nm] before optimization | HV [nm] after optimization | Difference Δ |
|---|---|---|---|
| 90 | −0.54879654 | −0.36532542 | 0.18347112 |
| 110 | 0.19030984 | 0.04403086 | 0.14627897 |
| 140 | 0.55631032 | 0.2781398 | 0.27817052 |

TABLE 8-continued

| pitch | HV [nm] before optimization | HV [nm] after optimization | Difference Δ |
|---|---|---|---|
| 180 | 0.3779319 | 0.19011843 | 0.18781347 |
| 250 | 0.36802477 | 0.16910316 | 0.19892161 |
| 500 | −0.06739512 | −0.08496163 | −0.01756651 |

TABLE 9

| pitch | OVL [nm] before optimization | OVL [nm] after optimization | Difference Δ |
|---|---|---|---|
| 90 | −0.33609839 | −0.16690079 | 0.1691976 |
| 110 | −0.13377339 | −0.01220941 | 0.12156398 |
| 140 | −0.14866116 | −0.05040817 | 0.09825298 |
| 180 | −0.27403985 | −0.1742175 | 0.09982234 |
| 250 | −0.27833902 | −0.192899 | 0.08544003 |
| 500 | −0.30159824 | −0.22785506 | 0.07374318 |

TABLE 10

| pitch | Telecentricity [mrad] before optimization | Telecentricity [mrad] after optimization | Difference Δ |
|---|---|---|---|
| 90 | −2.02573647 | −0.69436835 | 1.33136812 |
| 110 | −5.33776738 | −2.5596211 | 2.77814629 |
| 140 | −8.53805454 | −4.13551583 | 4.40253872 |
| 180 | −7.19794185 | −2.82028254 | 4.37765931 |
| 250 | −9.63064101 | −3.91872157 | 5.71191944 |
| 500 | −12.8822704 | −5.2802258 | 7.60204457 |

Figure 14:
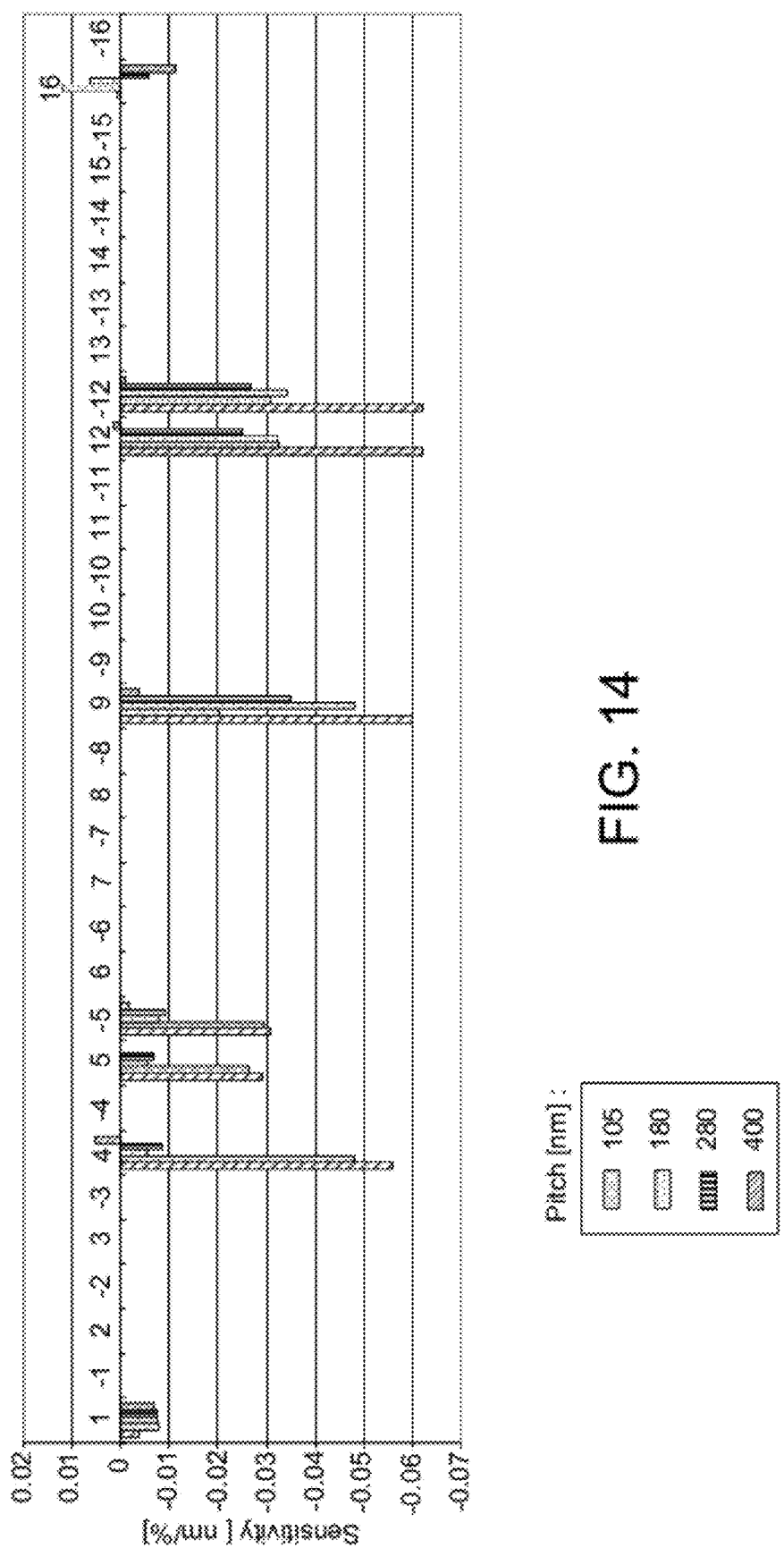
FIG. 14 illustrates an exemplary evaluation of the lithographic parameters based on a sensitivity analysis.

In some embodiments, the evaluation of the lithographic parameters can be performed based on a sensitivity analysis, wherein e.g. the change in CD (in nm per %) can be plotted for each OZP, which is exemplarily illustrated in FIG. 14, where the diattenuation sensitivities are plotted for a certain dipole setting. The legend given in the graph denotes the pitch (in nanometers) corresponding to each bar. In the example in FIG. 14, it can be gathered e.g. that a 1% change in the OZP No. 4 for diattenuation may result in a CD variation of approximately ~0.05 nm. If a complete spectrum of OZP's has been determined, each single coefficient of this spectrum can be multiplied by the respective sensitivity value. If e.g. the spectrum shows a value of 4% for the OZP 4, and the sensitivity amounts to 0.05 (nm per %) for this OZP 4, a CD variation of 4%*0.05 (nm/%)=0.2 nm is obtained, etc.

Then the desired performance of the respective lithographic parameter can be calculated as a scalar product between a "sensitivity vector" including the sensitivities for all OZP's and a "coefficient vector" describing the complete spectrum of OZP's. If, in addition to linear terms, also quadratic terms in the sensitivity coefficient relation are considered, this sensitivity vector becomes a sensitivity matrix, and the calculation of this scalar product can be written as follows:

$$\Delta CD = \sum_i S_i^{apo,lin} Z_i + \sum_i S_i^{dia,lin} OZ_i + \sum_i S_i^{ret,lin} OZ_i + \\ \sum_{i,j} S_{ij}^{apo,quad} Z_i Z_j + \sum_{i,j} S_{ij}^{dia,quad} OZ_i OZ_j + \sum_{i,j} S_{ij}^{ret,quad} OZ_i OZ_j \quad (47)$$

Figure 15:
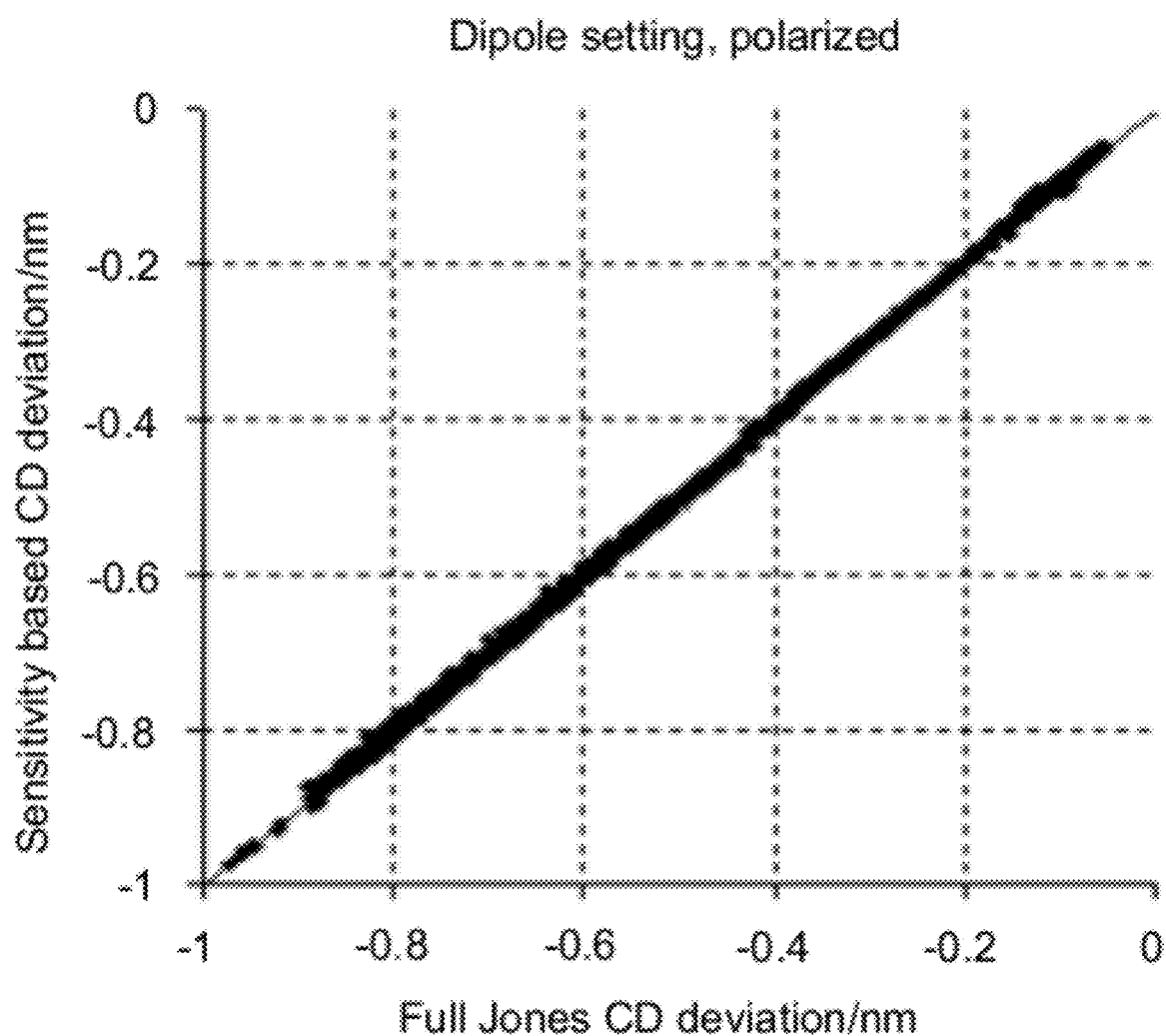
FIG. 15 illustrates a correlation between the CD deviation obtained using the above sensitivity approach, and the CD deviation obtained using an expansion based on OZP's.

As can be gathered from FIG. 15, a good correlation between the CD deviation obtained using the above sensitivity approach, on the one hand, and the result obtained for consideration of the whole Jones pupil in the simulation, on the other hand, is achieved. As data input for the simulations, measured data sets (Jones pupils) of a plurality of immersion projection lenses having a numerical aperture of NA=1.35 have been evaluated.

In most cases the consideration of the linear terms in equation (47) already gives a good correlation. In some cases, however, especially if the retardation is important, the inclusion of the quadratic terms might be involved to improve the accuracy. Furthermore, the cross correlation between apodization and diattenuation or between diattenuation and retardation can also be taken into account.

An analogous calculation, as given above for the CD deviation, can be performed e.g. for overlay errors. Furthermore, other settings, such as an annular setting, or other mask patterns may be analyzed.

Generally, using the above concept, any arbitrary Jones pupil can be described by an expansion into OZP's to obtain an OZP spectrum, followed by a multiplication of this OZP spectrum with a sensitivity vector or matrix related to the impact on the lithographic parameters. In other words, the evaluation or assessment of the optical system is, in that approach, not made using threshold values for certain OZP's, but based on the performance obtained in the relevant lithography parameters (CD deviation, overlay etc.) using the above sensitivity-based analysis.

It can be demonstrated that the sensitivity pattern of the Zernike expansion for the lens transmission (apodization), and that of the OZP expansion for retardation and diattenuation are quite similar and obeys similar symmetries.

Furthermore, a tendency can be observed that the lower order OZP dominate the sensitivity spectra. This means that it can already be sufficient to control a very limited number of OZP (e.g. up to an order of 20, up to an order of 15 or up to an order of 10) to control the vectorial imaging behaviour of a lithography lens.

Even if the disclosure has been described via certain embodiments numerous variations and alternative embodiments will be apparent to the man skilled in the art, for example by combination and/or exchange of features of individual embodiments. Accordingly it will be appreciated by the man skilled in the art that such variations and alternative embodiments are also embraced by the present disclosure and the scope of the disclosure is limited only in the sense of the accompanying claims and equivalents thereof.

What is claimed is:

1. A method, comprising:
    at least approximately describing a Jones pupil of a microlithographic projection exposure apparatus using an expansion into orientation Zernike polynomials;
    assessing the suitability of the microlithographic projection exposure apparatus on the basis of an expansion coefficient of at least one of the orientation Zernike polynomials in the expansion; and
    modifying the microlithographic projection exposure apparatus based on the assessment,
    wherein the orientation Zernike polynomials are defined as $$\vec{W}_{nm\epsilon} = R_n^{|m|} \vec{\Phi}_{m\epsilon};$$

wherein $R_n^m$ are radial polynomials given by $$R_n^m(r) = \sum_{s=0}^{(n-m)/2} (-1)^s \frac{(n-s)!}{s!\left(\frac{1}{2}(n+m)-s\right)!\left(\frac{1}{2}(n-m)-s\right)!} r^{n-2s}$$

with m, n, s being integers, m=−n, . . . , n and $\epsilon$=0 or 1; and
wherein $\vec{\Phi}_{m\epsilon}$ is given by $$\vec{\Phi}_{m0} = \begin{pmatrix} \cos\frac{m\varphi}{2} \\ -\sin\frac{m\varphi}{2} \end{pmatrix}, \vec{\Phi}_{m1} = \begin{pmatrix} \sin\frac{m\varphi}{2} \\ \cos\frac{m\varphi}{2} \end{pmatrix}$$

or a linear combination thereof.

2. The method according to claim 1, wherein the optical system is considered within tolerance if the expansion coefficient of the at least one of the orientation Zernike polynomials is less than a threshold value, and the optical system is considered not within tolerance if the expansion coefficient of the at least one of the orientation Zernike polynomials is not less than the threshold value.

3. The method according to claim 1, wherein the optical system is rated as being within tolerance only if the expansion coefficient of the at least one of the orientation Zernike polynomials between a center and an edge of an illumination field is less than a threshold value.

4. The method according to claim 1, further comprising:
    determining a sensitivity function, which describes, for at least for some of the orientation Zernike polynomials, an impact of the respective orientation Zernike polynomial on a lithography parameter; and
    assessing the suitability of the optical system using the sensitivity function.

5. The method according to claim 4, wherein the lithography parameter comprises a parameter selected from the group consisting of CD deviation, image placement errors and deviation between horizontal and vertical structures.

6. The method according to claim 4, wherein the sensitivity function is multiplied with the expansion.

7. The method according to claim 1, wherein the microlithographic projection exposure apparatus comprises at least one layer selected from the group consisting of anti-reflective layers and high-reflective layers, and a thickness and/or material of the at least one layer is modified in dependence of the assessment.

8. The method according to claim 1, wherein, during assessing, the expansion coefficients of only a subgroup of orientation Zernike polynomials are considered, and the number of orientation Zernike polynomials in the subgroup does not exceed 25.

9. The method according to claim 1, wherein, during assessing, only a subgroup of orientation Zernike polynomials are considered, and the order of orientation Zerknike polynomials in the subgroup does not exceed 20.

10. The method according to claim 1, wherein the optical system is a projection lens of the microlithographic projection exposure apparatus.

11. The method according to claim 1, wherein the optical system is a single optical element of the microlithographic projection exposure apparatus, or a group of elements of a projection lens of the microlithographic projection exposure apparatus.

12. A method, comprising:
at least approximately describing, for a microlithographic projection exposure apparatus comprising a plurality of optical systems, respective Jones pupils of at least two of the optical systems using an expansion into orientation Zernike polynomials; and
modifying at least one of the at least two optical systems such that a difference between an expansion coefficient of at least one of the orientation Zernike polynomials in the expansions for the at least two optical systems is reduced,
wherein the orientation Zernike polynomials are defined as $$\vec{W}_{nm\epsilon} = R_n^{|m|} \vec{\Phi}_{m\epsilon};$$

wherein $R_n^m$ are radial polynomials given by $$R_n^m(r) = \sum_{s=0}^{(n-m)/2} (-1)^s \frac{(n-s)!}{s!\left(\frac{1}{2}(n+m)-s\right)!\left(\frac{1}{2}(n-m)-s\right)!} r^{n-2s}$$

with m, n, s being integers, m=−n, . . . , n and $\epsilon$=0 or 1; and wherein $\vec{\Phi}_{m\epsilon}$ is given by $$\vec{\Phi}_{m0} = \begin{pmatrix} \cos\frac{m\varphi}{2} \\ -\sin\frac{m\varphi}{2} \end{pmatrix}, \vec{\Phi}_{m1} = \begin{pmatrix} \sin\frac{m\varphi}{2} \\ \cos\frac{m\varphi}{2} \end{pmatrix}$$

or a linear combination thereof.

13. A method, comprising:
at least approximately describing a Jones pupil for an initial design of an optical system of a microlithographic projection exposure apparatus using an expansion into orientation Zernike polynomials;
establishing a quality function that describes a variation in a lithography parameter, and which incorporates an expansion coefficient of at least one of the orientation Zernike polynomials in the expansion; and
modifying the initial design of the optical system such that the quality function is improved for the modified design with respect to the initial design,
wherein the orientation Zernike polynomials are defined as $$\vec{W}_{nm\epsilon} = R_n^{|m|} \vec{\Phi}_{m\epsilon};$$

wherein $R_n^m$ are radial polynomials given by $$R_n^m(r) = \sum_{s=0}^{(n-m)/2} (-1)^s \frac{(n-s)!}{s!\left(\frac{1}{2}(n+m)-s\right)!\left(\frac{1}{2}(n-m)-s\right)!} r^{n-2s}$$

with m, n, s being integers, m=−n, . . . , n and $\epsilon$=0 or 1; and wherein $\vec{\Phi}_{m\epsilon}$ is given by $$\vec{\Phi}_{m0} = \begin{pmatrix} \cos\frac{m\varphi}{2} \\ -\sin\frac{m\varphi}{2} \end{pmatrix}, \vec{\Phi}_{m1} = \begin{pmatrix} \sin\frac{m\varphi}{2} \\ \cos\frac{m\varphi}{2} \end{pmatrix}$$

or a linear combination thereof.

14. The method according to claim 13, wherein the optical system comprises at least one layer selected from the group consisting of an anti-reflective and a high-reflective layer, and designing comprises varying the thickness and/or the material of at least one of the layers.

15. The method according to claim 12, wherein a number of orientation Zernike polynomials in the expansion does not exceed 25.

16. The method according to claim 12, wherein each of the at least two optical systems is a single optical element of the microlithographic projection exposure apparatus, or a group of elements of a projection lens of the microlithographic projection exposure apparatus.

17. The method according to claim 13, wherein the lithography parameter comprises a parameter selected from the group consisting of CD deviation, image placement errors and deviation between horizontal and vertical structures.

18. The method according to claim 13, wherein the optical system is a projection lens of the microlithographic projection exposure apparatus.

19. The method according to claim 13, wherein the optical system is a single optical element of the microlithographic projection exposure apparatus, or a group of elements of a projection lens of the microlithographic projection exposure apparatus.

20. The method according to claim 13, wherein a number of orientation Zernike polynomials in the expansion does not exceed 25.

* * * * *

UNITED STATES PATENT AND TRADEMARK OFFICE
CERTIFICATE OF CORRECTION

PATENT NO.      : 8,126,669 B2
APPLICATION NO. : 12/421996
DATED           : February 28, 2012
INVENTOR(S)     : Michael Totzeck It is certified that error appears in the above-identified patent and that said Letters Patent is hereby corrected as shown below:

Column 1,
Line 43-48, delete "The so-called Zernike....convenient base set." and insert the same below "diattenuation." on Col. 1, Line 44 as a different paragraph.

Column 5,
Line 39, After "lens" insert --;--

Column 6,
Line 15, Delete "state.→retardance" and insert --state→retardance.--

Column 12,
Line 63, Delete "(==1," and insert --(j=1,--

Column 15,
Line 34, Delete "(=-∞" and insert --(j=-∞--

Column 15,
Line 35, delete "((=0," and insert --(j=0,--

Column 15,
Line 35, delete "((j=0," and insert --(j=0,--

Column 15,
Line 60, delete "o$_{-j}$s$_{j+1}$" and insert --o$_{-j}$=s$_{j+1}$--

Column 16,
Line 8, delete "catadoptrical" and insert --catadioptrical--

Signed and Sealed this
Fifteenth Day of May, 2012

David J. Kappos
*Director of the United States Patent and Trademark Office*

CERTIFICATE OF CORRECTION (continued)
U.S. Pat. No. 8,126,669 B2

Column 20,
Line 42, delete "~0.05" and insert -- -0.05--

Column 22,
Line 58, delete "Zerknike" and insert --Zernike--